United States Patent
Chappell et al.

(10) Patent No.: US 9,651,688 B2
(45) Date of Patent: May 16, 2017

(54) NEUTRON DETECTION

(71) Applicant: Nova Scientific, Inc., Sturbridge, MA (US)

(72) Inventors: Jon H. Chappell, Nottingham, NH (US); W. Bruce Feller, Tolland, CT (US)

(73) Assignee: Nova Scientific, Inc., Sturbridge, MA (US)

( * ) Notice: Subject to any disclaimer, the term of this patent is extended or adjusted under 35 U.S.C. 154(b) by 0 days.

(21) Appl. No.: 15/082,226

(22) Filed: Mar. 28, 2016

(65) Prior Publication Data

US 2016/0320499 A1 Nov. 3, 2016

Related U.S. Application Data

(63) Continuation of application No. 13/842,904, filed on Mar. 15, 2013, now Pat. No. 9,297,914.

(60) Provisional application No. 61/658,370, filed on Jun. 11, 2012.

(51) Int. Cl.
*G01T 3/00* (2006.01)
*G01T 1/28* (2006.01)
*G01T 3/08* (2006.01)

(52) U.S. Cl.
CPC ............. *G01T 3/00* (2013.01); *G01T 1/28* (2013.01); *G01T 3/08* (2013.01)

(58) Field of Classification Search
CPC ............. G01T 3/00; G01T 3/08; G01T 1/28
See application file for complete search history.

(56) References Cited

U.S. PATENT DOCUMENTS

| | | |
|---|---|---|
| 7,265,359 B2 | 9/2007 | Ambrosi et al. |
| 2010/0001193 A1 | 1/2010 | Feller et al. |
| 2011/0049379 A1 | 3/2011 | Moses |
| 2011/0155919 A1 | 6/2011 | Tokanai et al. |
| 2011/0226958 A1 | 9/2011 | Feller et al. |

FOREIGN PATENT DOCUMENTS

| | | |
|---|---|---|
| JP | 2001-013254 | 1/2001 |
| WO | WO 2010/039300 | 4/2010 |

OTHER PUBLICATIONS

International Preliminary Report on Patentability; PCT/US2013/044960; May 22, 2014; 13 pages.
Supplementary European Search Report; Appln. No. EP 13803655.3; Feb. 2, 2016; 5 pages.
Siegmund et al.; "High Spatial and Temporal Resolution Neutron Imaging with Microchannel Plate Detectors", IEEE Transactions on Nuclear Science, vol. 56, No. 3, Jun. 1, 2009; pp. 1203-1209.

*Primary Examiner* — David Porta
*Assistant Examiner* — Faye Boosalis
(74) *Attorney, Agent, or Firm* — Fish & Richardson P.C.

(57) ABSTRACT

A method for detecting a neutron includes providing a first voltage to an input electrode of a microchannel plate, providing a second voltage to an output electrode of the microchannel plate, the second voltage being more positive than the first voltage, measuring a signal on the output electrode, and detecting a neutron based on a comparison of the signal at the output electrode with a baseline value.

67 Claims, 22 Drawing Sheets

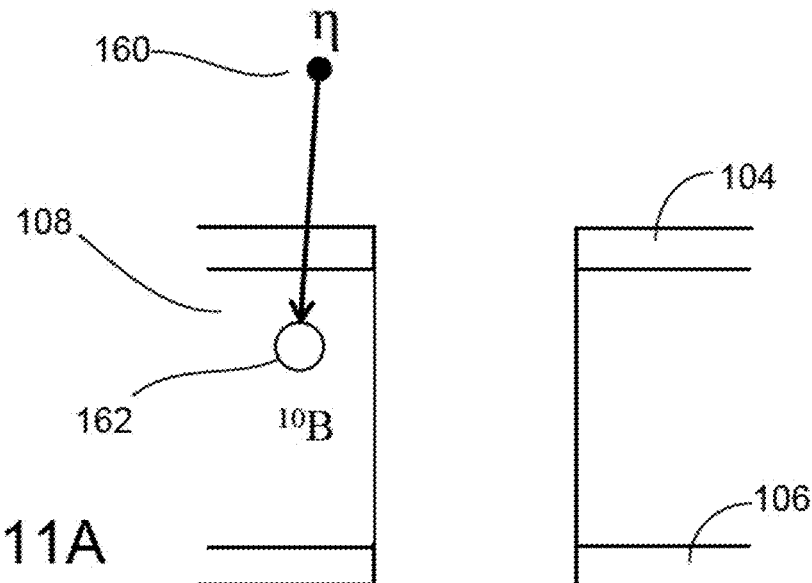
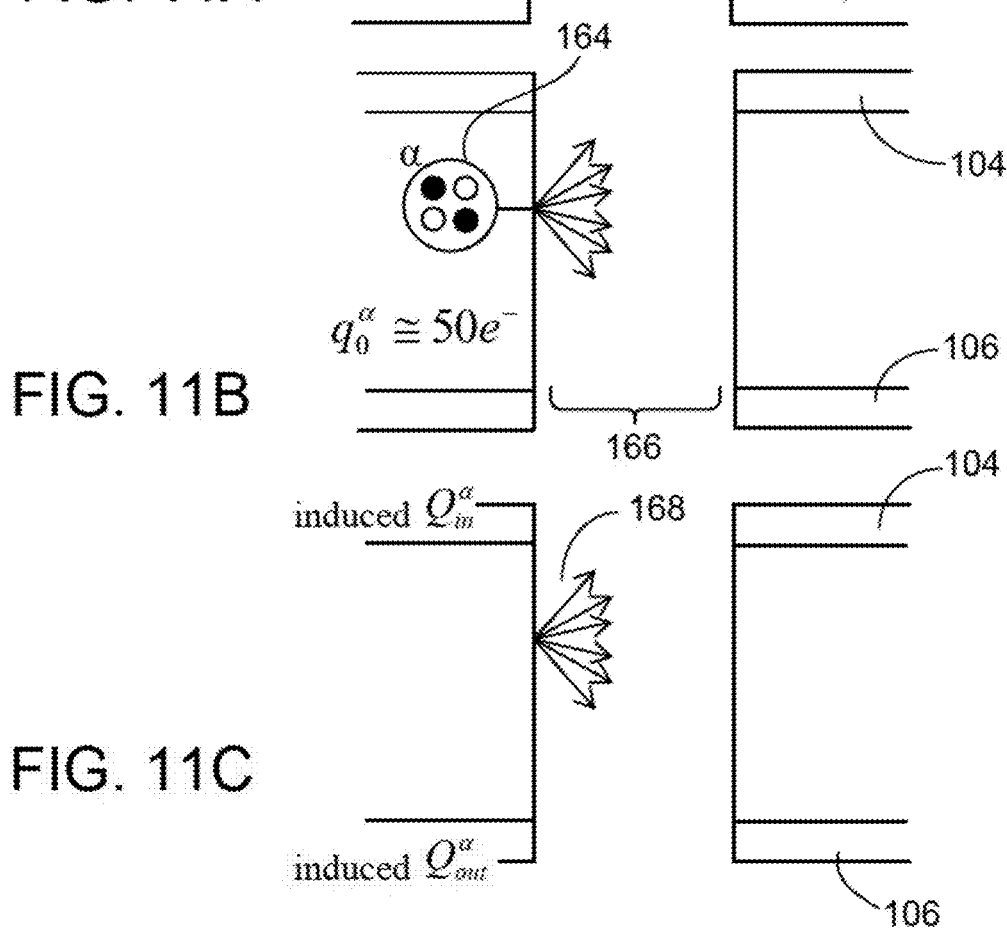

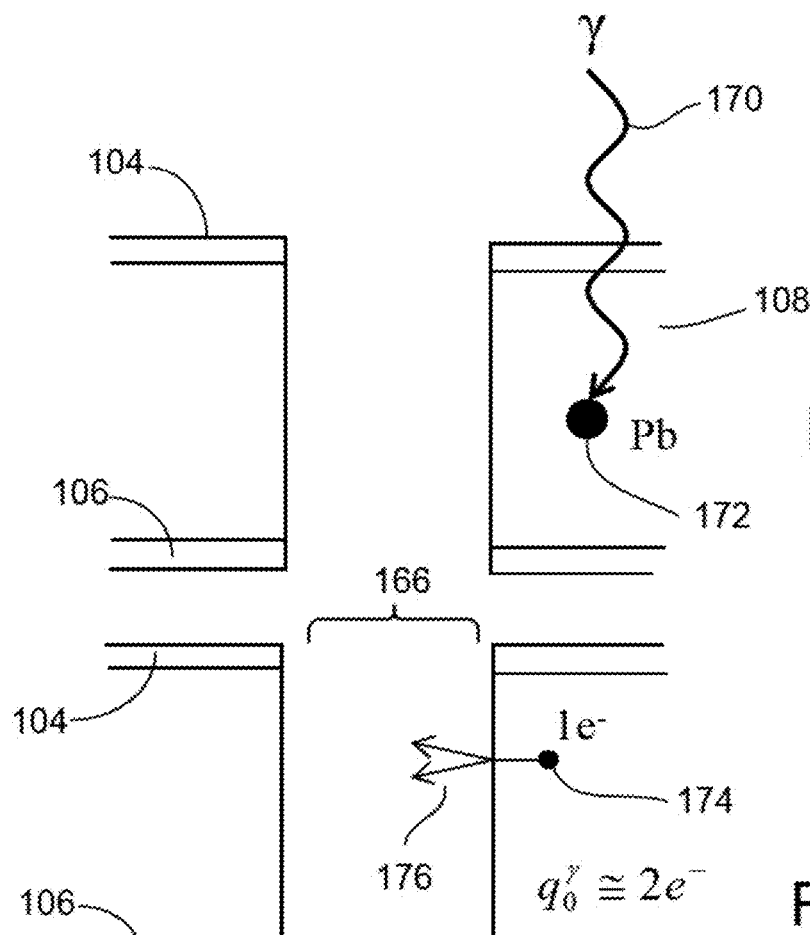
FIG. 12A
FIG. 12B
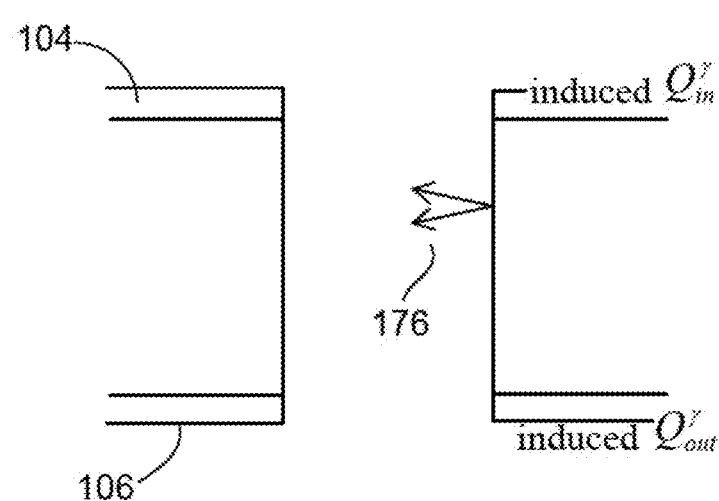
FIG. 12C

ND DETECTION

CROSS-REFERENCE TO RELATED APPLICATIONS

This application is a continuation of U.S. patent application Ser. No. 13/842,904, filed on Mar. 15, 2013, which claims priority to U.S. Provisional Patent Application 61/658,370, filed on Jun. 11, 2012. The contents of the above applications are incorporated by reference.

STATEMENT REGARDING FEDERALLY SPONSORED RESEARCH OR DEVELOPMENT

This invention was made with government support under DNDO contract HSHQDC-11-C-00130. The government has certain rights in the invention.

BACKGROUND

This invention relates to neutron detection.

Neutron-sensitive microchannel plates (MCP) can be used to detect special nuclear materials (SNM), such as plutonium, or can be used as highly effective detectors in neutron imaging or neutron diffraction. A microchannel plate can be formed by bonding a glass plate between an input electrode and an output electrode, and providing a high voltage direct current (DC) field between the electrodes. The glass plate is perforated with a substantially regular, parallel array of microscopic channels, for example, cylindrical and hollow channels. Each channel, which can serve as an independent electron multiplier, has an inner wall surface formed of a semi-conductive and electron emissive layer.

The glass plate can be doped with, for example, boron-10, which can capture neutrons in reactions that generate lithium-7 and alpha particles. As the lithium-7 and alpha particles enter nearby channels and collide against the wall surfaces to produce secondary electrons, a cascade of electrons can be formed as the secondary electrons accelerate along the channels (due to the DC field), and collide against the wall surfaces farther along the channels, thereby increasing the number of secondary electrons. Alternatively, although having a smaller neutron capture cross-section, the glass plate can be doped with lithium-6, resulting in triton and alpha particle reaction products which likewise produce a cascade of electrons. The electron cascades develop along the channels and are amplified into detectable signals that are electronically registered and processed to construct a digital image. The resultant intensity map or image corresponds to the variation in neutron flux striking the microchannel plate surface. Contrast differences within the image of a sample can be used to infer physical and chemical properties.

SUMMARY

In one aspect, a method for detecting a neutron is provided. The method includes providing a first voltage to an input electrode of a microchannel plate; providing a second voltage to an output electrode of the microchannel plate, the second voltage being more positive than the first voltage; measuring a first signal on the input electrode; measuring a second signal on the output electrode; and detecting a neutron based on a comparison of the first and second signals.

Implementations of the method can include one or more of the following features. A determination can be made that a neutron has been detected when the polarity of the second signal is opposite to that of the first signal for a period of time. A determination can be made that a neutron has been detected when the amplitude of the second signal is also above a predetermined threshold. A determination can be made that a neutron has been detected when the polarity of the first and second signals are the same for a first period of time and opposite for a second period of time. The method can include detecting an avalanche of secondary electrons reaching an anode of the microchannel plate. Detecting a neutron can include determining that a neutron has been detected when, for a period of time after the avalanche of secondary electrons have been detected, the polarity of the second signal is opposite to that of the first signal. The method can include integrating the first signal over a period of time to generate a first integral, integrating the second signal over the period of time to generate a second integral, in which detecting a neutron includes detecting a neutron based on a comparison of the first and second integrals. Detecting a neutron can include detecting a neutron when the first integral and the second integral have different polarities. The method can include providing a third voltage to an anode associated with the microchannel plate, the third voltage being more positive than the second voltage. The method can include measuring a third signal at the anode, in which a neutron is detected when, during a period of time, the first and second signals have different polarities, and the second and third signals have the same polarity. A neutron can be detected when the first signal remains positive relative to a baseline value for a period of time, and the second signal is positive relative to the baseline value for a first sub-period within the period of time and is negative relative to the baseline value for a second sub-period within the period of time. The microchannel plate can have a structure between the input and output electrodes, the structure including a hydrogen-containing material. The hydrogen-containing material can include a polymer. The hydrogen-containing material can include plastic. The hydrogen-containing material can be doped with at least one of boron-10 or lithium-6. The hydrogen-containing material can define microchannels, and a layer of neutron sensitive material can be disposed on walls of the microchannels. The neutron sensitive material can include at least one of boron-10 or lithium-6.

In one aspect, a method includes discriminating between a neutron and a gamma ray by using a first signal on a first electrode and a second signal on a second electrode, the first and second signals being influenced by moving charged particles generated as a result of an interaction between an incident particle or radiation and a material disposed between the first and second electrodes, the material comprising a first component that is sensitive to neutrons and a second component that is sensitive to gamma rays; and generating a detection signal indicating that a neutron has been detected when the first signal and the second signal have different polarities.

Implementations of the method can include one or more of the following features. The material can include an array of microscopic channels, interconnected fibers, or interconnected microspheres. The material can include a hydrogen-containing material. The hydrogen-containing material can include a polymer. The hydrogen-containing material can include plastic. The charged particles can include electrons traveling in the bulk of the material. The method can include detecting an avalanche of secondary electrons traveling in a channel in the material, in which the first and second signals are detected after detecting the avalanche of secondary electrons. A detection signal indicating that a neutron has been detected can be generated when the second signal also has an amplitude above a predetermined threshold.

In one aspect, a method for detecting a neutron is provided. The method includes providing a microchannel plate having an input electrode and an output electrode, the input and output electrodes being connected to different voltages; and generating a signal indicating detection of a neutron when, for a first period of time, a first signal at the output electrode has a polarity different from the polarity of a second signal at the input electrode.

Implementations of the method can include the following feature. A signal indicating detection of a neutron can be generated when the first and second signals have the same polarity for a second period of time prior to the first period of time.

In one aspect, a neutron detector includes a microchannel plate having an input electrode, an output electrode, and a glass plate comprising microscopic channels, the input electrode to be connected to a first voltage, the output electrode to be connected to a second voltage different from the first voltage; and a data processor to determine whether a neutron has been detected based on a comparison of a first signal on the input electrode and a second signal on the output electrode.

Implementations of the neutron detector can include one or more of the following features. The data processor can be configured to determine that a neutron has been detected when the polarity of the second signal is opposite to that of the first signal for a period of time. The data processor can be configured to determine that a neutron has been detected when the amplitude of the second signal is also above a predetermined threshold. The data processor can be configured to determine that a neutron has been detected when the polarity of the first and second signals are the same for a first period of time and opposite for a second period of time. The data processor can be configured to detect an avalanche of secondary electrons reaching an anode associated with the microchannel plate, and determine that a neutron has been detected when, for a period of time after the avalanche of secondary electrons have been detected, the polarity of the second signal is opposite to that of the first signal. The data processor can be configured to integrate the first signal over a period of time to generate a first integral, integrate the second signal over the period of time to generate a second integral, compare the first and second integrals, and determine that a neutron has been detected based on a comparison of the first and second integrals. The data processor can be configured to determine that a neutron has been detected when the first integral and the second integral have different polarities. The microchannel plate can include an anode connected to a third voltage that is more positive than the second voltage, the second voltage being more positive than the first voltage, and the data processor can be configured to determine that a neutron has been detected when, during a period of time, the first and second signals have different polarities, and the second and third signals have the same polarity. The data processor can be configured to determine that a neutron has been detected when the first signal remains positive relative to a baseline value for a period of time, and the second signal is positive relative to the baseline value for a first sub-period within the period of time and is negative relative to the baseline value for a second sub-period within the period of time. The neutron detector can include a first high pass filter coupled to the first electrode, a first amplifier to amplify the first signal, a second high pass filter coupled to the second electrode, and a second amplifier to amplify the second signal. The microchannel plate has a structure between the input and output electrodes, in which the structure can include a hydrogen-containing material. The hydrogen-containing material can include a polymer. The hydrogen-containing material can include plastic. The hydrogen-containing material can be doped with at least one of boron-10 or lithium-6. The hydrogen-containing material can define microchannels, and a layer of neutron sensitive material can be disposed on walls of the microchannels. The neutron sensitive material can include at least one of boron-10 or lithium-6. The neutron detector can include additional pairs of input and output electrodes, a portion of the glass plate being disposed between each pair of the input and output electrodes, and for each pair of input and output electrodes, the data processor can be configured to discriminate between a neutron and a gamma ray by using a third signal on the input electrode and a fourth signal on the output electrode, the third and fourth signals being influenced by moving charged particles generated as a result of an interaction between an incident particle or radiation and the portion of the glass plate disposed between the pair of input and output electrodes, and the data processor can be configured to determine that a neutron has been detected when the third signal and the fourth signal have different polarities for a period of time.

In one aspect, a neutron detector includes a first electrode; a second electrode; a material disposed between the first and second electrodes, the material comprising a first component that is sensitive to neutrons and a second component that is sensitive to gamma rays; and a data processor configured to discriminate between a neutron and a gamma ray by using a first signal on the first electrode and a second signal on the second electrode, the first and second signals being influenced by moving charged particles generated as a result of an interaction between an incident particle or radiation and the material disposed between the first and second electrodes, the data processor configured to determine that a neutron has been detected when the first signal and the second signal have different polarities for a period of time.

Implementations of the neutron detector can include one or more of the following features. The material can include an array of microscopic channels, interconnected fibers, or interconnected microspheres. The charged particles can include electrons traveling in the bulk of the material. The data processor can be configured to detect an avalanche of secondary electrons traveling in a channel in the material, and detect the first and second signals after detecting the avalanche of secondary electrons. The data processor can be configured to generate a detection signal indicating that a neutron has been detected when the second signal also has an amplitude above a predetermined threshold. The material disposed between the first and second electrodes can include a hydrogen-containing material. The hydrogen-containing material can include a polymer. The hydrogen-containing material can include plastic. The hydrogen-containing material can be doped with at least one of boron-10 or lithium-6. The hydrogen-containing material can define microchannels, and a layer of neutron sensitive material can be disposed on walls of the microchannels. The neutron sensitive material can include at least one of boron-10 or lithium-6. The neutron detector can include additional pairs of electrodes, a portion of the material being disposed between each pair of the electrodes, and for each pair of the electrodes, the data processor can be configured to discriminate between a neutron and a gamma ray by using a third signal on one of the pair of electrodes and a fourth signal on another of the pair of electrodes, the third and fourth signals being influenced by moving charged particles generated as a result of an interaction between an incident particle or radiation and the portion of material disposed between the pair of electrodes, and the data processor can be configured to determine that a neutron has been detected when the third signal and the fourth signal have different polarities for a period of time.

In one aspect, a neutron detector includes a microchannel plate having an input electrode and an output electrode, the input and output electrodes being connected to different voltages; and a data processor configured to determine that a neutron has been detected when, for a first period of time, a first signal at the output electrode has a polarity different from the polarity of a second signal at the input electrode.

Implementations of the neutron detector can include one or more of the following features. The data processor can be configured to generate a signal indicating detection of a neutron when the first and second signals have the same polarity for a first period of time, and have opposite polarities for a second period of time. The microchannel plate can have a structure between the input and output electrodes, in which the structure can include a hydrogen-containing material. The hydrogen-containing material can include a polymer. The hydrogen-containing material can include plastic. The hydrogen-containing material can be doped with at least one of boron-10 or lithium-6. The hydrogen-containing material can define microchannels, and a layer of neutron sensitive material can be disposed on walls of the microchannels. The neutron sensitive material can include at least one of boron-10 or lithium-6. The microchannel plate can have a plurality of output electrodes, each output electrode being coupled to an electronic circuit for detecting a signal on the corresponding output electrode.

In one aspect, a method for detecting a neutron is provided. The method can include providing a first voltage to an input electrode of a microchannel plate; providing a second voltage to an output electrode of the microchannel plate, the second voltage being more positive than the first voltage; measuring a signal on the output electrode; and detecting a neutron based on a comparison of the signal at the output electrode with a baseline value.

Implementations of the method can include one or more of the following features. A determination can be made that a neutron has been detected when the signal at the output electrode is negative for a period of time. A determination can be made that a neutron has been detected when the amplitude of the signal at the output electrode is also above a predetermined threshold. A determination can be made that a neutron has been detected when the signal at the output electrode is positive for a first period of time and negative for a second period of time. The method can include detecting an avalanche of secondary electrons reaching an anode of the microchannel plate, a determination can be made that a neutron has been detected when, for a period of time after the avalanche of secondary electrons have been detected, the signal at the output electrode becomes negative. The method can include integrating the signal at the output electrode over a period of time to generate an integral, in which a neutron is detected when the integral has a negative value. The method can include providing a third voltage to an anode associated with the microchannel plate, the third voltage being more positive than the second voltage, and measuring a signal at the anode, in which a neutron can be detected when, during a period of time, the signal at the output electrode has a polarity that is the same as the signal at the anode. The microchannel plate can have a structure between the input and output electrodes, and the structure can include a hydrogen-containing material. The hydrogen-containing material can include a polymer. The hydrogen-containing material can include plastic. The hydrogen-containing material can be doped with at least one of boron-10 or lithium-6. The hydrogen-containing material can define microchannels, and a layer of neutron sensitive material can be disposed on walls of the microchannels. The neutron sensitive material can include at least one of boron-10 or lithium-6.

In one aspect, a method includes providing a first electrode, a second electrode, and a material disposed between the first and second electrodes, the material comprising a first component that is sensitive to neutrons and a second component that is sensitive to gamma rays; providing a first voltage to the first electrode; providing a second voltage to the second electrode, the second voltage being more positive than the first voltage; discriminating between a neutron and a gamma ray by using a signal on the second electrode, the signal being influenced by moving charged particles generated as a result of an interaction between an incident particle or radiation and the material disposed between the first and second electrodes; and generating a detection signal indicating that a neutron has been detected when the signal on the second electrode is negative.

Implementations of the method can include one or more of the following features. The material can include an array of microscopic channels, interconnected fibers, or interconnected microspheres. The material can include a hydrogen-containing material. The hydrogen-containing material can include a polymer. The hydrogen-containing material can include plastic. The hydrogen-containing material can be doped with at least one of boron-10 or lithium-6. The hydrogen-containing material can define microchannels, and a layer of neutron sensitive material can be disposed on walls of the microchannels. The neutron sensitive material can include at least one of boron-10 or lithium-6. The charged particles can include electrons traveling in the bulk of the material. The method can include detecting an avalanche of secondary electrons traveling in a channel in the material, in which detecting the signal at the second electrode can include detecting the signal at the second electrode after detecting the avalanche of secondary electrons. A detection signal indicating that a neutron has been detected can be generated when the signal at the second electrode also has an amplitude above a predetermined threshold.

In one aspect, a method for detecting a neutron is provided. The method includes providing a microchannel plate having an input electrode and an output electrode, the input electrode being connected to a first voltage, the output electrode being connected to a second voltage that is more positive than the first voltage; and generating a signal indicating detection of a neutron when, for a first period of time, a signal at the output electrode is negative.

Implementations of the method can include the following feature. A signal indicating detection of a neutron can be generated when the signal at the output electrode is positive for a second period of time prior to the first period of time.

In one aspect, a neutron detector includes a microchannel plate having an input electrode, an output electrode, and a glass plate including microscopic channels, the input electrode to be connected to a first voltage, the output electrode to be connected to a second voltage different from the first voltage; and a data processor to determine whether a neutron has been detected based on a polarity of a signal on the output electrode.

Implementations of the neutron detector can include one or more of the following features. The data processor can be configured to determine that a neutron has been detected when the polarity of the second signal is opposite to that of the first signal for a period of time. The data processor can be configured to determine that a neutron has been detected when the amplitude of the second signal is also above a predetermined threshold. The data processor can be configured to determine that a neutron has been detected when the polarity of the first and second signals are the same for a first period of time and opposite for a second period of time. The data processor can be configured to detect an avalanche of secondary electrons reaching an anode associated with the microchannel plate, and determine that a neutron has been detected when, for a period of time after the avalanche of secondary electrons have been detected, the polarity of the second signal is opposite to that of the first signal. The data processor can be configured to integrate the first signal over a period of time to generate a first integral, integrate the second signal over the period of time to generate a second integral, compare the first and second integrals, and determine that a neutron has been detected based on a comparison of the first and second integrals. The data processor can be configured to determine that a neutron has been detected when the first integral and the second integral have different polarities. The microchannel plate can include an anode connected to a third voltage that is more positive than the second voltage, the second voltage being more positive than the first voltage, and the data processor can be configured to determine that a neutron has been detected when, during a period of time, the first and second signals have different polarities, and the second and third signals have the same polarity. The data processor can be configured to determine that a neutron has been detected when the first signal remains positive relative to a baseline value for a period of time, and the second signal is positive relative to the baseline value for a first sub-period within the period of time and is negative relative to the baseline value for a second sub-period within the period of time. The neutron detector can include a first high pass filter coupled to the first electrode, a first amplifier to amplify the first signal, a second high pass filter coupled to the second electrode, and a second amplifier to amplify the second signal.

BRIEF DESCRIPTION OF DRAWINGS

FIGS. 11A to 11C are diagrams showing an interaction between an incident neutron and a boron-10 atom.

FIGS. 12A to 12C are diagrams showing an interaction between an incident gamma ray and a lead atom.

DETAILED DESCRIPTION

A neutron detector having a microchannel plate can distinguish between neutrons and gamma rays based on characteristics of charges induced on input and output electrodes of the microchannel plate. The microchannel plate is a thin glass plate having an array of microscopic channels. In some implementations, when an incident neutron or a gamma ray interacts with the glass plate, the interaction produces moving charged particle clusters that move through the solid channel wall material in response to a strong electric field gradient, that induce electric charges in the input and output electrodes. Due to different energy levels of the particles generated from the interactions, the electric charges induced on the input and output electrodes for an incident neutron are different from those for an incident gamma ray. By using information about the charges induced on the output electrode, or both the input and output electrodes, one can detect neutrons with high confidence and reject accompanying gamma ray interference.

Figure 1:
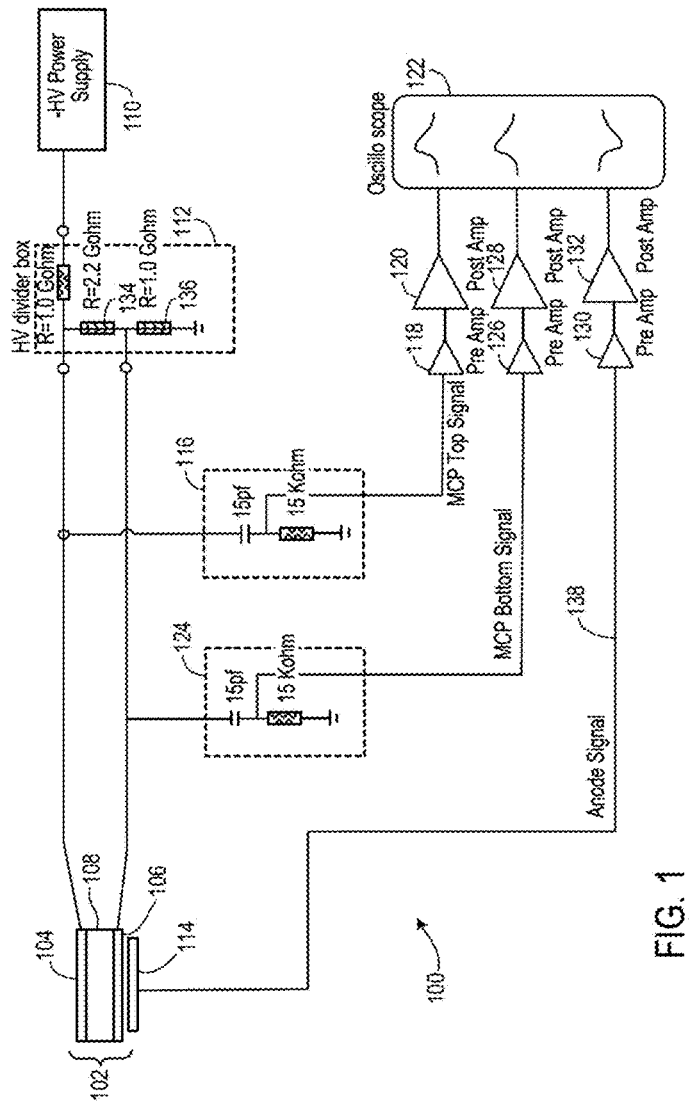
FIG. 1 is a block diagram of a neutron detector.

Referring to FIG. 1, a neutron detector 100 includes a microchannel plate 102 have an input electrode 104 (also referred to as a front electrode), an output electrode 106 (also referred to as a rear electrode), and a glass plate 108 positioned between the input and output electrodes 104, 106. The input electrode 104 is positioned at the side of the microchannel plate where neutrons and gamma rays are input to the microchannel plate. The glass plate 108 has an array of microscopic channels each having a diameter of about, for example, 5 to 10 microns (μm). Each channel can have, for example, a circular, square, rectangle, or hexagon cross sectional shape. Each channel serves as an independent electron multiplier and has an inner wall surface formed of a semi-conductive and electron emissive layer. The glass plate 108 can have a thickness of, e.g., about 1 mm. The input and output electrodes 104, 106 can be, for example, metal layers that are coated onto the top and bottom surfaces of the glass plate 108. The input and output electrodes 104, 106 have openings that correspond to the channel openings.

The terms "top" and "bottom" refer to the relative positions of surfaces of the MCP 102 when the MCP 102 is oriented such that the surfaces of the MCP are horizontal, and incoming radiation enters the microchannels from the top. The MCP 102 can be used in various orientations and in various positions relative to a radiation source such that what we refer to as the "top surface" may actually be positioned below the "bottom surface."

In some implementations, the microchannel plate 102 includes boron-10 ($^{10}$B) doped glass that forms the walls that define the channels. When an incident neutron interacts with a boron-10 atom, an alpha particle (helium-4 or $^4$He) and a lithium-7 ($^7$Li) particle are released, as in the reactions below:

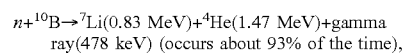
$n+^{10}B\rightarrow\,^7Li(0.83$ MeV$)+^4He(1.47$ MeV$)+$gamma ray(478 keV) (occurs about 93% of the time),

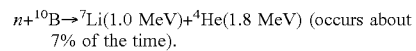
$n+^{10}B\rightarrow\,^7Li(1.0$ MeV$)+^4He(1.8$ MeV$)$ (occurs about 7% of the time).

One or both of the lithium-7 and helium-4 particles pass out of the glass and enter one or more adjacent channels, in most cases freeing several electrons along the way. In addition, other charged particles, for example protons, hydroxyl ions (OH⁻), alkali ions (the glass plate 108 may include alkaline oxides) may also be freed by the lithium-7 and helium-4 particles, emerge from the glass walls and enter into the channels. For example, the glass plate 108 may include cesium oxides, and the alkali ions may include cesium ions.

In some implementations, the microchannel plate 102 includes lithium-6 ($^6$Li) doped glass that forms the walls that define the channels. When an incident neutron interacts with a lithium-6 atom, a triton and an alpha particle are released, as in the reactions below:

$$n + {}^6\text{Li} \rightarrow \text{triton}(2.75 \text{ MeV}) + \text{alpha}(2.05 \text{ MeV}).$$

One or both of the triton and alpha particles pass out of the glass and enter one or more adjacent channels, in most cases freeing several (for example, 10 to 100) electrons along the way. In addition, other charged particles, such as protons, hydroxyl ions (OH$^-$), alkali ions (the glass plate 108 may include alkaline oxides) may also be freed by the triton and alpha particles, emerge from the glass walls and enter into the channels. For example, the glass plate 108 may include cesium oxides, and the alkali ions may include cesium ions.

In some implementations, the input electrode 104 may be connected to a voltage of about −2000 to −1000 volts, and the output electrode 106 may be connected to a voltage of about −100 volts. The voltages can be generated by a high-voltage power supply 110 and a voltage divider 112 having series connected resistors 134 and 136. The DC voltage difference between the input and output electrodes 104, 106 generates an electric field (e.g., about 1 kV/mm) that attracts the free electrons toward the output electrode 106. As the electrons strike against the channel walls, more electrons are released, triggering an avalanche of secondary electrons in the microchannels. The electrons pass through the openings in the output electrode 106 and are collected by an anode collector 114.

The input electrode 104 is connected to a first high pass filter 116 that attenuates low frequency signals and allows high frequency signals to pass to a pre-amplifier 118 and an amplifier 120, which amplifies the signal from the input electrode 104 and sends the amplified signal to an oscilloscope 122. For example, the high frequency signals can refer to signals having periods in a range from about 10 to 100 microseconds, and the low frequency signals can refer to signals having frequencies that are less than 100 Hz. The output electrode 106 is connected to a second high pass filter 124 that attenuates low frequency signals and allows high frequency signals to pass to a pre-amplifier 126 and an amplifier 128, which amplifies the signal from the output electrode 106 and sends the amplified signal to the oscilloscope 122. The anode 114 is connected to a pre-amplifier 130 and an amplifier 132, which amplifies the signal from the anode 114 and sends the amplified signal to the oscilloscope 122.

The glass plate 108 may include a proportion of elements with medium or higher atomic number (e.g., Z>~10), which increase the tendency for gamma ray absorption and charged particle conversion. For example, when an incident gamma ray interacts with a high Z lead atom (Z=82), an energetic photoelectron is released, which passes out of the glass and enters an adjacent hollow channel, in most cases liberating a few secondary electrons (e.g., less than 10) from the channel walls. The one or a few electrons are attracted toward the output electrode 106, and as the electrons strike against the channel walls, more electrons are released, triggering an avalanche of secondary electrons in the microchannels. The electrons pass through the openings in the output electrode 106 and are collected by the anode 114. Such gamma ray-induced events may be confused with neutron events.

The avalanche of secondary electrons in the microchannels can occur within a few nanoseconds or less of the occurrence of a neutron event (meaning that a neutron is captured by the microchannel plate 102) or a gamma ray event (meaning that a gamma ray is captured by the microchannel plate 102). Due to the strong electric field (~1 kV/mm) between the input and output electrodes, the secondary electrons travel exceedingly fast inside the evacuated microchannels. Thus, upon a neutron or gamma ray event, a pulse signal can be detected at the anode 114 within about several nanoseconds or less. The pulse in an anode signal 138 is a result of the secondary electron avalanche inducing a negative-going charge pulse at the anode 114, so the anode pulse is typically a negative pulse. In this description, a negative pulse means that the pulse peak is negative relative to a baseline voltage, which is the voltage level at the anode 114 when there is no neutron or gamma ray event.

After the detection of the avalanche of secondary electrons at the anode 114, another set of signals can be detected at the input electrode 104, the output electrode 106, and the anode 114. As described in more detail below, after a gamma ray event, a positive pulse can be detected at the input electrode 104 and a positive pulse can also be detected at the output electrode 106. After a neutron event, a positive pulse can be detected at the input electrode 104, regardless of pulse integration time and a negative pulse can be detected at the output electrode 106, depending upon pulse integration time. In this description, a positive pulse means that the pulse peak is positive relative to the baseline voltage, regardless of pulse integration time. The baseline voltage for the input electrode 104 is the voltage level at the input electrode 104 when there is no neutron or gamma ray event. The baseline voltage for the output electrode 106 is the voltage level at the output electrode 106 when there is no neutron or gamma ray event. The positive and negative pulses on the electrodes occur, e.g., within about 5 to 50 μs after occurrence of the neutron or gamma ray events. These induced pulses are due, not to the secondary electron avalanche inside the hollow microchannel, but in a qualitatively different way, to the movement of a large bulk ionization charge or charge clusters, within the solid channel wall material, the motion of which induces charge on the MCP metal electrode.

In some implementations, by observing the pulses at the output electrode 106, it is possible to determine whether a neutron or some other radiation or particle has been detected. If the signal at the output electrode 106 is negative, integrated over a certain time period, there is a high probability that a neutron has been detected. If the signal at the output electrode 106 is positive, integrated over a comparable time period, there is a high probability that something other than a neutron, such as a gamma ray, ion, electron, ultra-violet ray, X-ray, has been detected.

In some implementations, the pulse signal at the output electrode 106 is integrated over a period of time, such as several microseconds, or about 1 to 50 μs, and the sign of the integral is used to determine whether a neutron is detected. If the integral is negative, there is a high probability that a neutron has been detected. If the integral is positive, it is likely that something other than a neutron, such as a gamma ray or ion, electron, ultra-violet ray, X-ray, has been detected.

In some implementations, the signal at the output electrode 106 may be inverted and amplified, such that a positive pulse is detected after a neutron event and a negative pulse is detected after a gamma ray event. Similarly, in some implementations, the signal at the output electrode 106 may be inverted and integrated over a period of time, such that a positive integral is generated after a neutron event and a negative integral is generated after a gamma ray event.

A calibration of the neutron detector 100 is performed in which a known neutron source is used to provide neutrons, and the time-integrated signal at the output electrode 106 is measured to determine whether it is positive or negative. A known source of gamma rays is used to provide gamma rays, and the signal at the output electrode 106 is measured to determine whether it is positive or negative. The calibration results are stored. Afterwards, detection of a neutron or a gamma ray can be determined based on the calibration data.

In some implementations, by observing the pulses at both the input electrode 104 and the output electrode 106, it is possible to determine whether a neutron or some other radiation or particle has been detected. When a gamma ray is detected, the integral of the signal at the output electrode 106 integrated over a specified period of time has a polarity that is the same as the polarity of the integral of the signal at the input electrode 104 integrated over a comparable period of time. When a neutron is detected, the integral of the signal at the output electrode 106 integrated over a specified period of time has a polarity that is opposite to the polarity of the integral of the signal at the input electrode 104 integrated over a comparable period of time.

In some implementations, the pulse signal at the input electrode 104 is integrated over a period of time (such as several microseconds, or about 1 to 50 µs) to generate a first integral, and the pulse signal at the output electrode 106 is integrated over the period of time to generate a second integral. When a gamma ray is detected, the first integral has a polarity that is the same as the polarity of the second integral. When a neutron is detected, the first integral has a polarity that is opposite to the polarity of the second integral.

Figure 2:
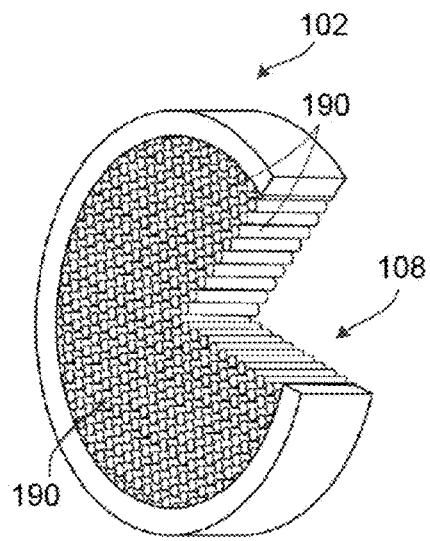
FIG. 2 is a diagram of a glass plate of a microchannel plate.

FIG. 2 is a diagram of microchannels 190 in the glass plate 108 of the microchannel plate 102.

Figure 3:
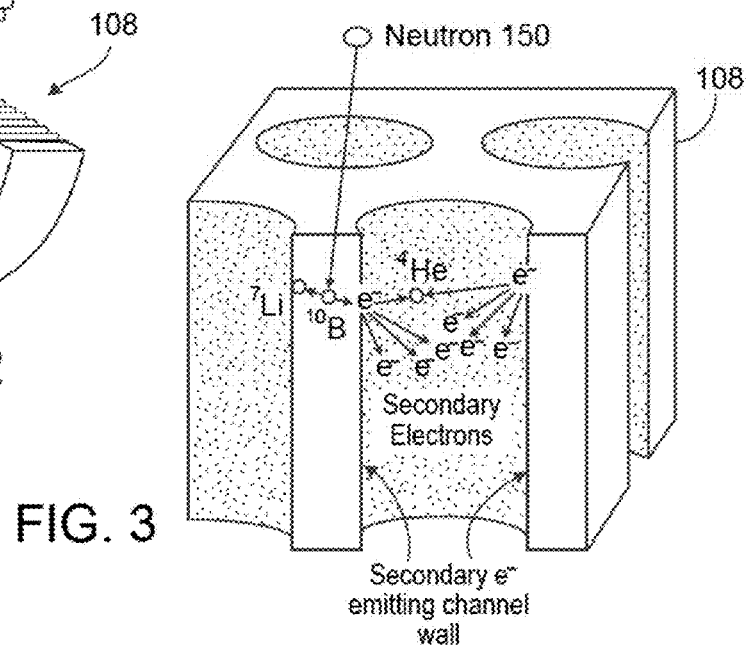
FIG. 3 is a diagram of neutron capture and conversion in a microchannel plate.

FIG. 3 is a diagram of a bulk channel wall interaction between a neutron and a boron-10 atom, with the resulting alpha and lithium reaction particles producing secondary electrons in the hollow microchannels.

Figure 4:
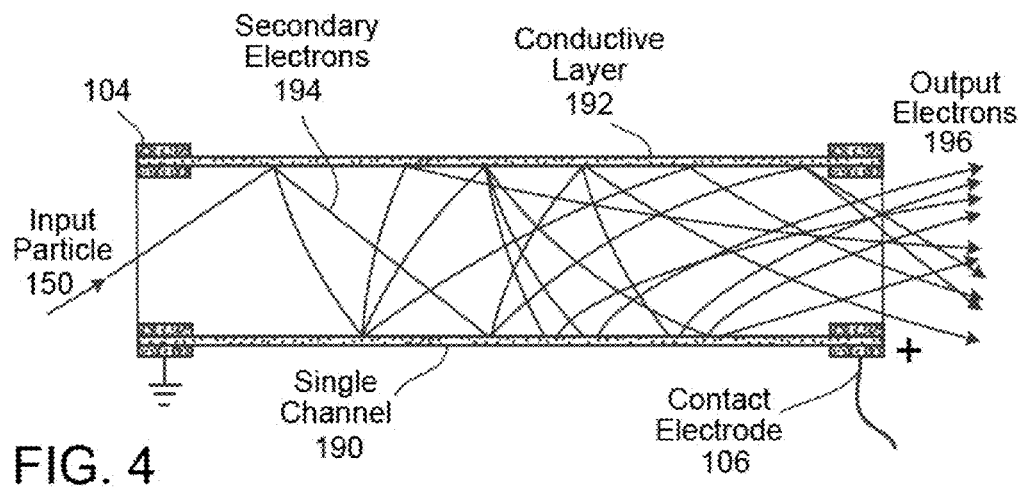
FIG. 4 is a diagram of a microchannel and an avalanche of secondary electrons.

FIG. 4 is a diagram showing a development of an avalanche of secondary electrons, as depicted here in response to an input particle striking the surface of the channel wall (e.g., photon or electron).

Referring to FIGS. 2, 3, and 4, the glass plate 108 has a substantially regular, parallel array of microscopic channels 190. A high DC voltage 110 is applied between the input and output electrodes 104, 106. Each channel 190, which can serve as an independent electron multiplier, has an inner wall surface formed of a semiconductive and electron emissive layer 192. The bulk of the glass plate 108, which forms the structure supporting the microchannels, includes (e.g., is formed of) one or more neutron-sensitive compositions, such as compounds that include boron-10 (or lithium-6).

In the example where the glass includes boron-10, in operation, when an incident neutron 150 strikes the glass plate 108, the neutron 150 is captured by a boron-10 atom, and an alpha particle ($^4$He) and a lithium-7 ($^7$Li) particle are released, in opposite directions to conserve momentum. One or both of the lithium-7 and helium-4 particles pass out of the glass and enter one or more adjacent channels 190, freeing secondary electrons along the way. Concurrently, the DC bias voltage 110 is applied between the input and output electrodes 104, 106 such that output electrode 106 has a more positive DC bias voltage than the input electrode 104. The DC bias voltage generates an electric field (e.g., about 1 kV/mm) that attracts free electrons toward the output electrode 106. As free electrons strike the channel walls, more electrons (for example, secondary electrons 194) are released to form a cascade of electrons 196 that exit the bottom surface of the glass plate 108 and is detected as a signal pulse at the anode 114 (FIG. 1). Thus, the glass plate 108 acts as an electron multiplier.

Figure 5:
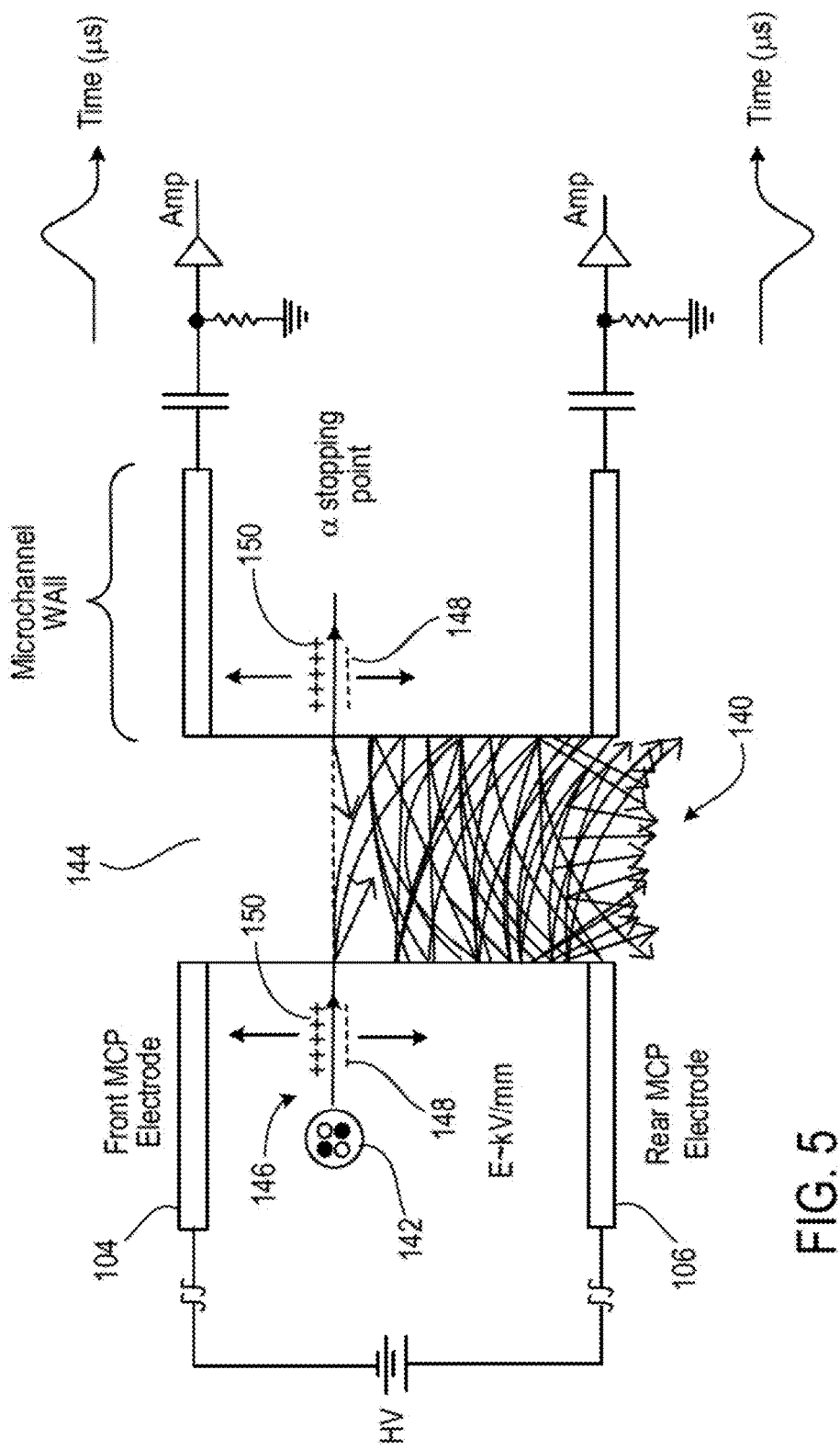
FIG. 5 is a diagram depicting an avalanche of electrons and electron-ion pairs.

FIG. 5 is a diagram depicting an avalanche of electrons 140 that results when a helium-4 particle 142 and the accompanying secondary electrons (freed from the channel wall surface by the helium-4 particle as it traverses a microchannel wall surface within the glass plate 108) enter a microchannel 144. A similar avalanche of electrons results when a lithium-7 particle and the accompanying electrons (freed by the lithium-7 particle as it traverses a microchannel wall surface within the glass plate 108) enter another microchannel.

In the example shown in FIG. 5, the high energy (MeV) alpha particle 142 travels substantially in a straight line in the glass, exits the glass and enters the microchannel 144, then re-enters the glass and travels a distance in the glass before stopping. The alpha particle 142 generates secondary electrons primarily from the microchannel wall surface, in the microchannel 144 as described above. In addition, the energetic alpha particle 142 also generates a far larger number of electron-ion (or electron-hole) pairs 146 and electronic excitations in the glass, through the well-known ionization energy loss process (−dE/dx). The electron-ion pairs 146 can include electrons 148 that are attracted toward the output electrode 106, and ions 150 that are attracted toward the input electrode 104. The fastest electrons produced by the electronic excitations include delta (δ) rays, which produce secondary ionization and excitations. Due to the statistical nature of the collisions, alpha particles of a given energy may have different "ranges" (distance until stopped), a phenomena called range straggling.

Regardless of the distance travelled by the alpha particle 142, the alpha particle 142 will generate a large number of electrons 148 and ions 150 before the alpha particle 142 loses its energy and stops. The velocity of the electrons 148 and ions 150 in the glass material of the channel wall is smaller by orders of magnitude as compared with the ballistic trajectories of the avalanche electrons within the evacuated microchannel 144, so it takes far more time for electrons to travel through the glass material than the microchannel 144 for the same distance. Therefore, the signal detected or induced at the output electrode 106 caused by the moving electrons 148 occurs at a later time compared to the signal detected at the anode 114 caused by the avalanche electrons in the evacuated microchannel 144.

The pulse signals induced in the input and output electrodes due to the bulk movement of electron-ion pairs 150 occur on a microsecond time scale, which is perhaps set by two factors, one intrinsic to the microchannel plate, and one extrinsic to the microchannel plate (e.g., the pulse pickoff circuit and its time constant). The intrinsic factor is the ionization charge from −dE/dx ionization energy loss (e.g., $10^4$-$10^5$ electrons, generated by MeV alpha particles and/or Li nuclei generated in the neutron-$^{10}$B reaction) moving down through the solid microchannel wall towards the rear electrode (see FIG. 5), and where the electron cluster motion and velocity induces a negative pulse on the rear or output electrode 106. This sizeable electron charge cluster, which may be as large as over 10,000 electrons or more than a fC (femtoCoulomb) moving down through the solid wall, takes up to tens of microseconds to travel the up to about 1 mm distance of the glass plate thickness, inducing the negative pulse through its velocity during this motion (calculated on the basis of the value of the electron mobility characteristic of the microchannel plate glass and the electric field strength). The pulse width observed on the oscilloscope 122 may also be impacted or complicated by the RC time constant of the pulse pickoff circuits, including the high pass filter 116 and the high pass filter 124 located between the electrodes and the amplifier stage.

Although the example neutron detector 100 of FIG. 1 uses a glass microchannel plate, detecting neutrons based on the negative-going pulses at the output electrode 106 will also work for microchannel plates made of a hydrogen-containing material, such as a polymer or plastic. The plastic microchannel plates can be doped with a neutron-sensitive material, such as boron-10 or lithium-6. Alternatively, a layer of neutron sensitive material (e.g., boron-10 or lithium-6) can be disposed (e.g., by atomic layer deposition) on walls of the microchannels. Additional layers of material may be disposed on the walls of the microchannels, such as a layer of semiconducting material and a layer of electron emissive material. Examples of microchannel plates having layers of materials disposed on walls of the microchannels, the layers including a layer of neutron sensitive material, a layer of semiconducting material, and a layer of electron emissive material, are described in U.S. patent application Ser. No. 13/069,898, filed on Mar. 23, 2011, herein incorporated by reference. U.S. patent application Ser. No. 13/069,898 is assigned to the same assignee as this patent application.

The plastic microchannel plates can be used for fast neutron detection (i.e., at MeV neutron energies), where the knock-on proton (also having an energy of ~MeV since it is an elastic collision) would similarly cause ionization tracks of thousands of electron-ion pairs in plastic microchannel walls due to the –dE/dx Linear Energy Transfer processes. The proton range at, e.g., 1 MeV would be somewhat longer, at 15-20 microns, as opposed to the 1 MeV alpha range of 4 microns. Moreover, if the plastic MCP incorporates boron-10 or lithium-6 in the material, the processes for inducing the charges described above can also apply.

The microchannel plate can also be replaced by a microsphere plate or a microfiber plate. When a microsphere plate or a microfiber plate is used, the detection of a neutron can be determined in a similar manner as when a microchannel plate is used.

The principle described above also works in both non-leaded glass microchannel plates and leaded glass microchannel plates. A non-leaded glass microchannel plate may use atomic layer deposition to deposit semiconducting and electron emissive layers on the walls of the microchannels. Leaded glass microchannel plates can use either hydrogen firing or atomic layer deposition processing.

FIGS. 6 and 7A to 7L illustrate the effect of neutrons on the signals detected at the front electrode 104, the rear electrode 106, and the anode 114. The time scale in the oscilloscope graph is 5 μs/div.

Figure 6:
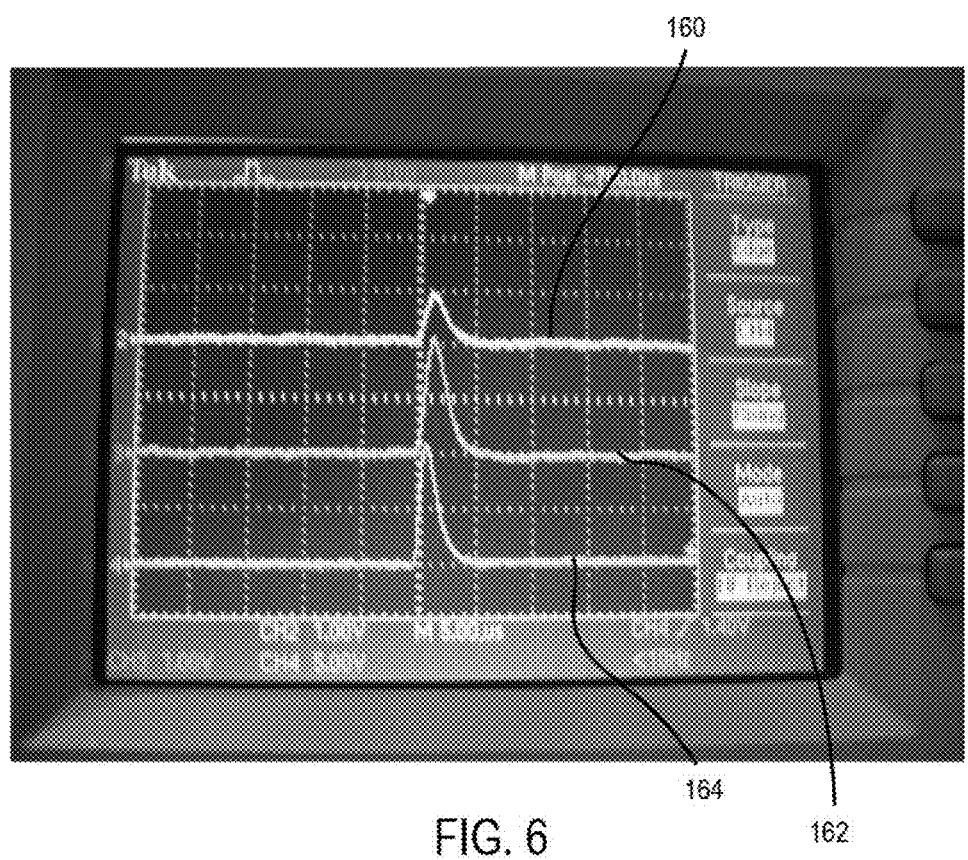
FIGS. 6 and 7A to 7L show example oscilloscope screen photos.
Figure 7A:
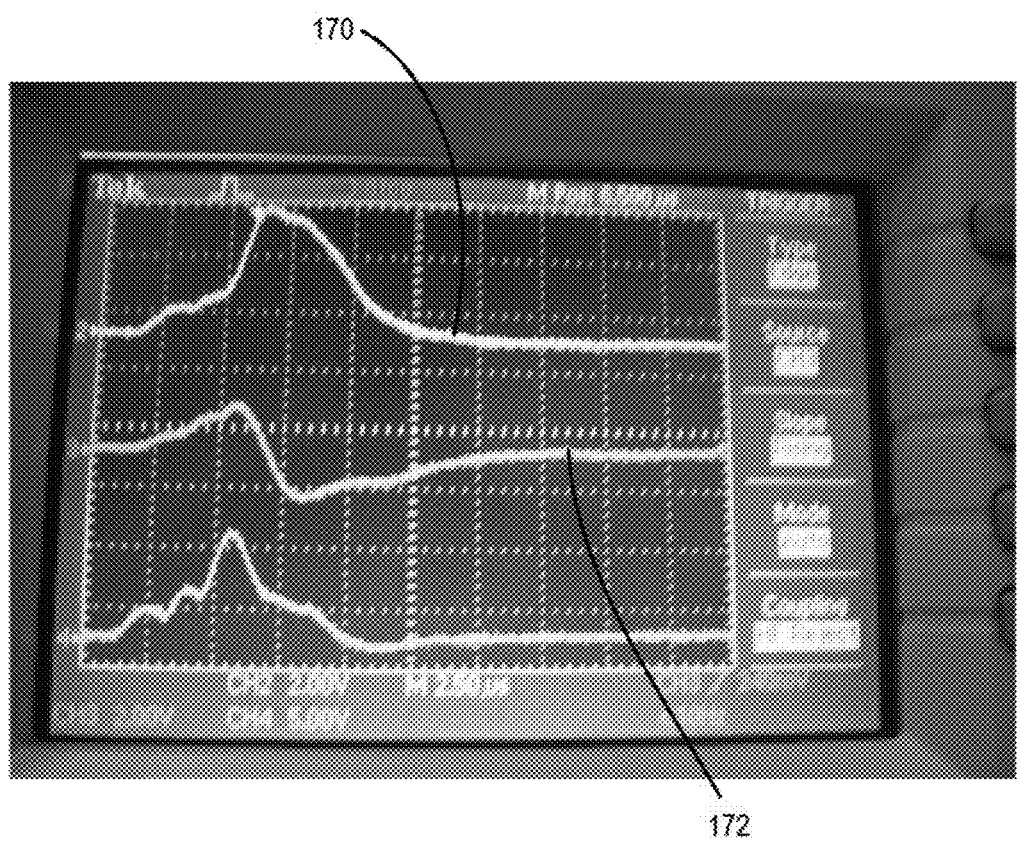
Figure 7B:
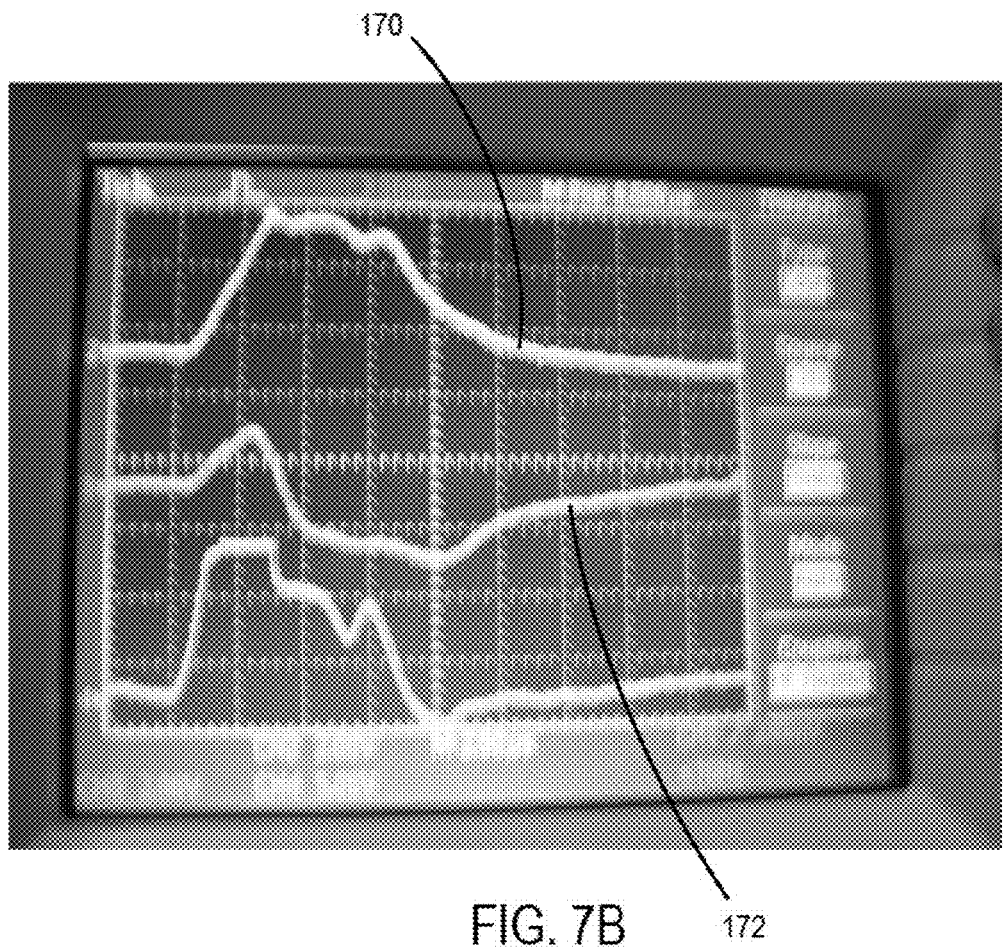
Figure 7C:
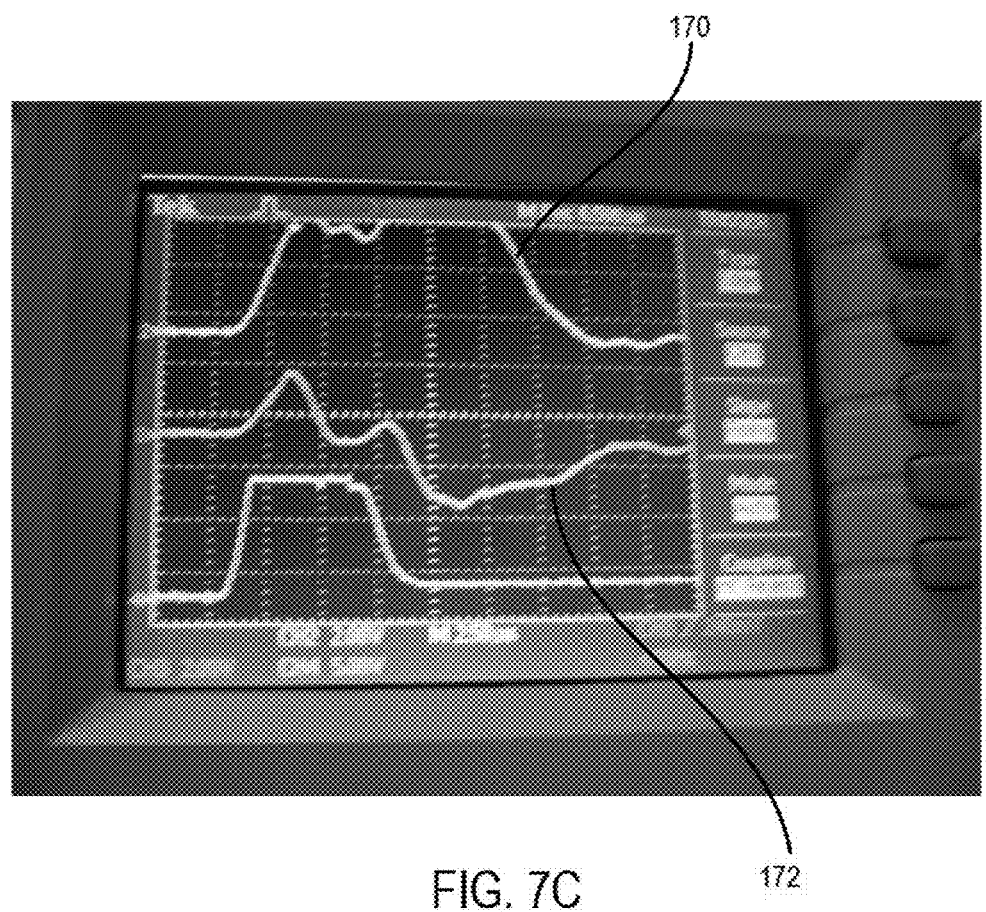
Figure 7D:
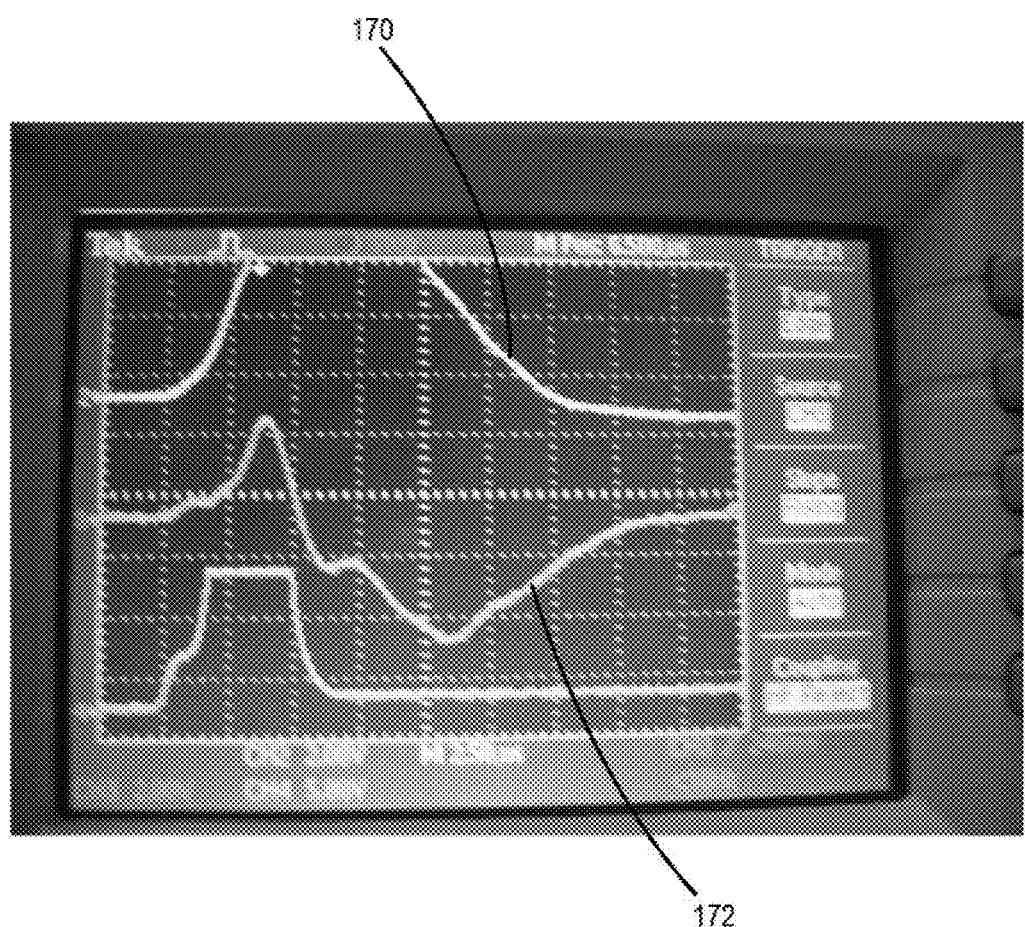
Figure 7E:
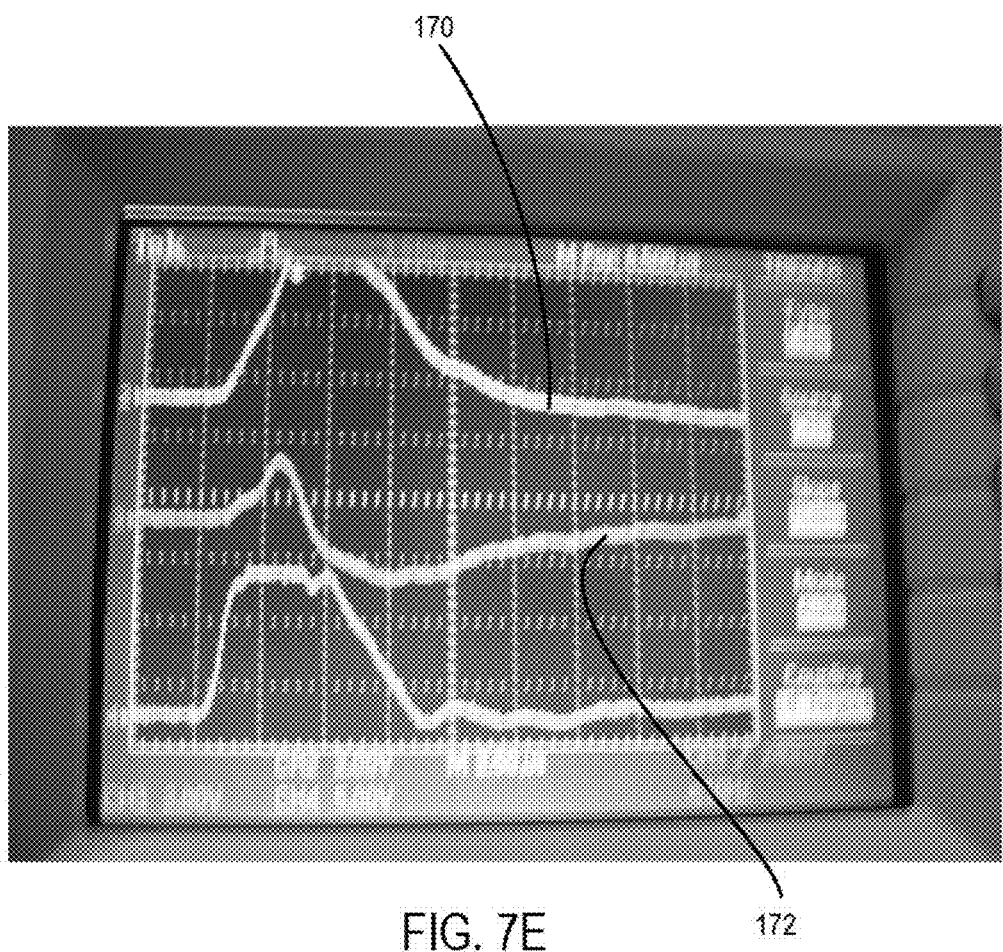
Figure 7F:
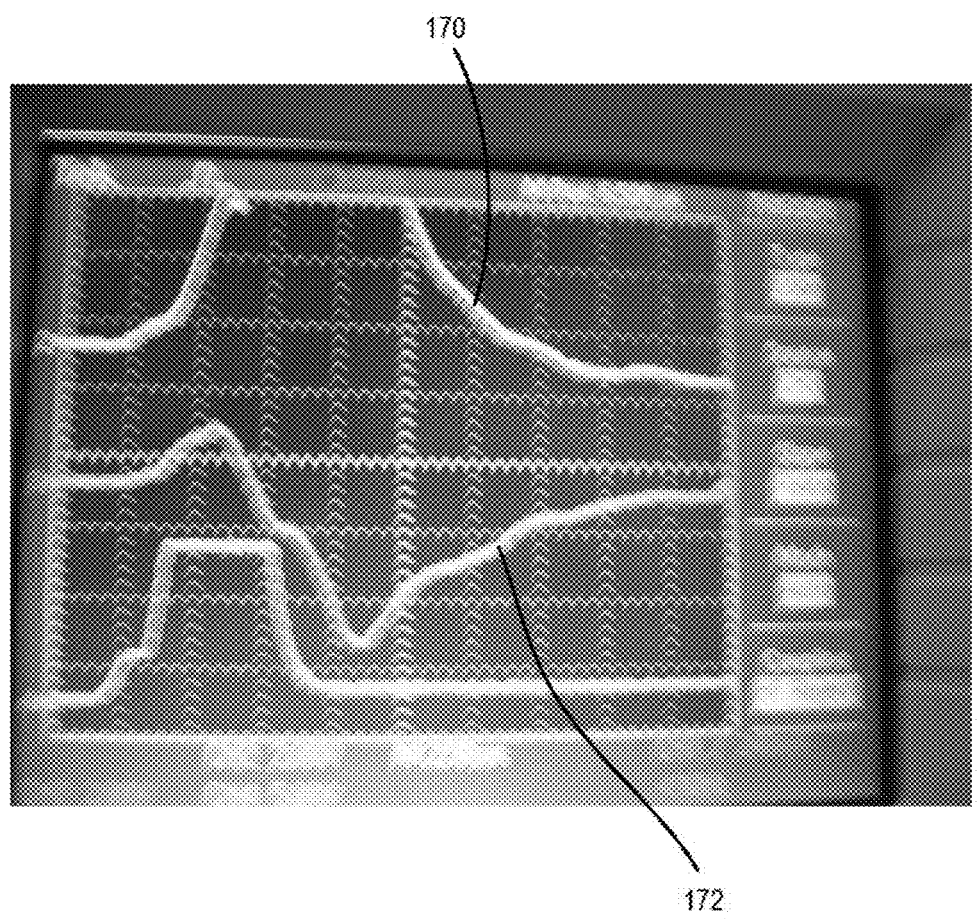
Figure 7G:
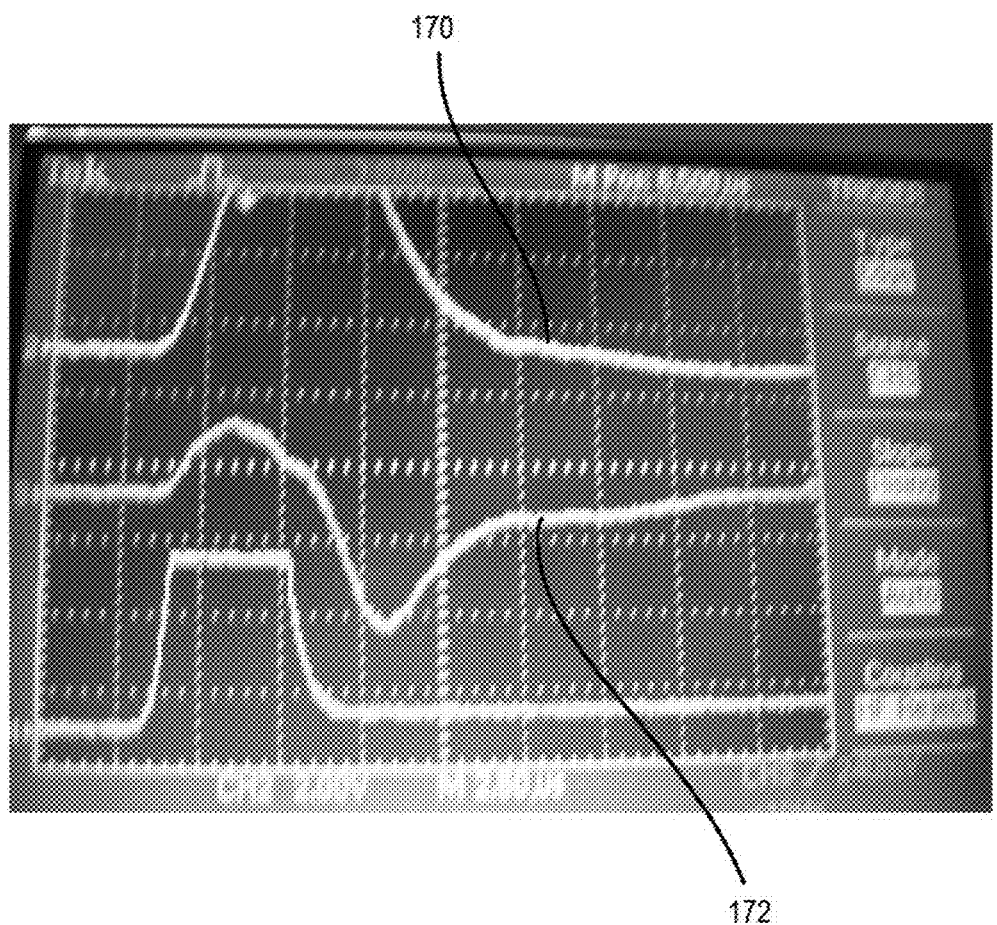
Figure 7H:
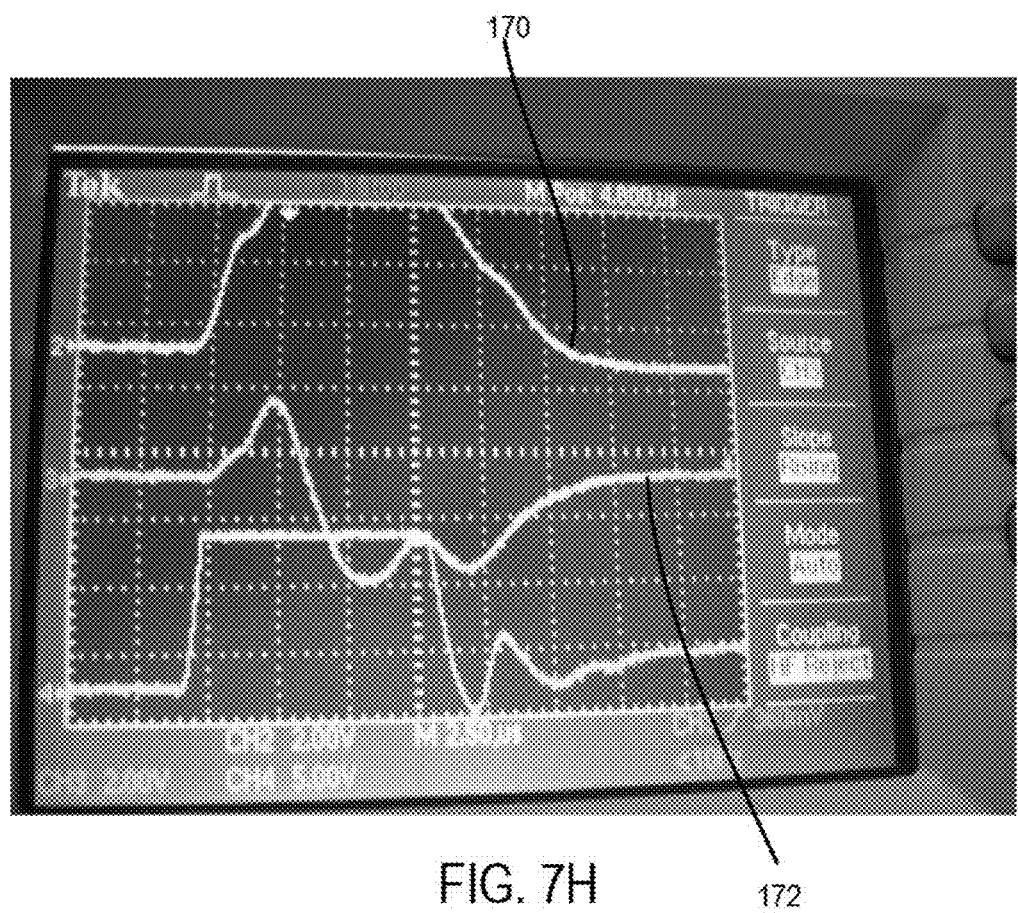
Figure 7I:
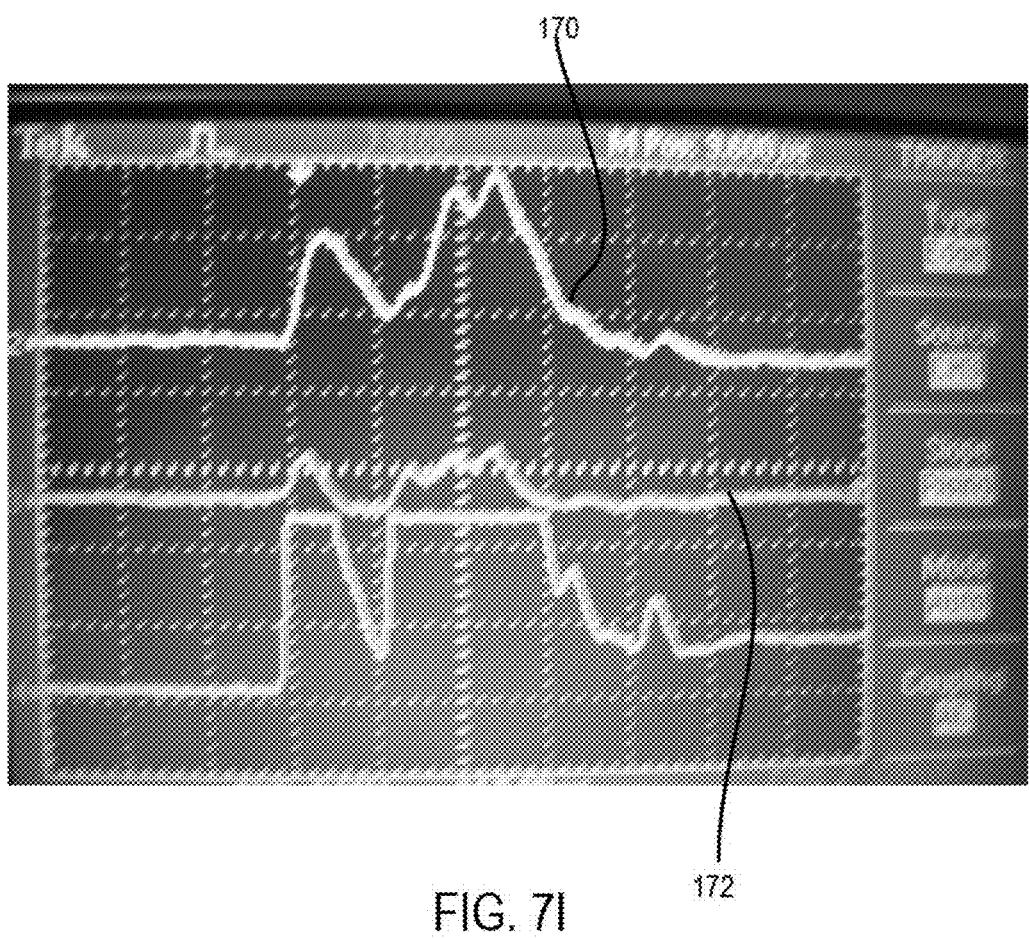
Figure 7J:
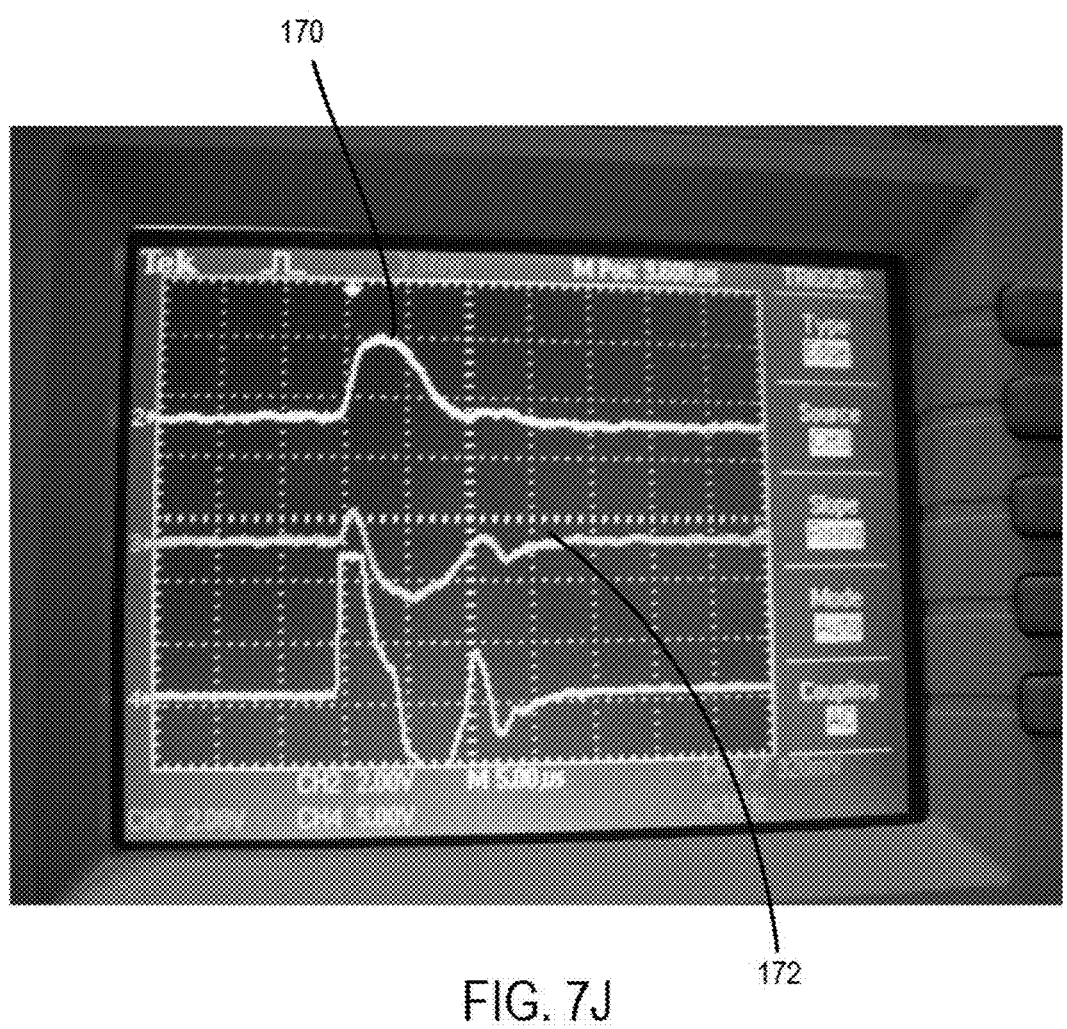
Figure 7K:
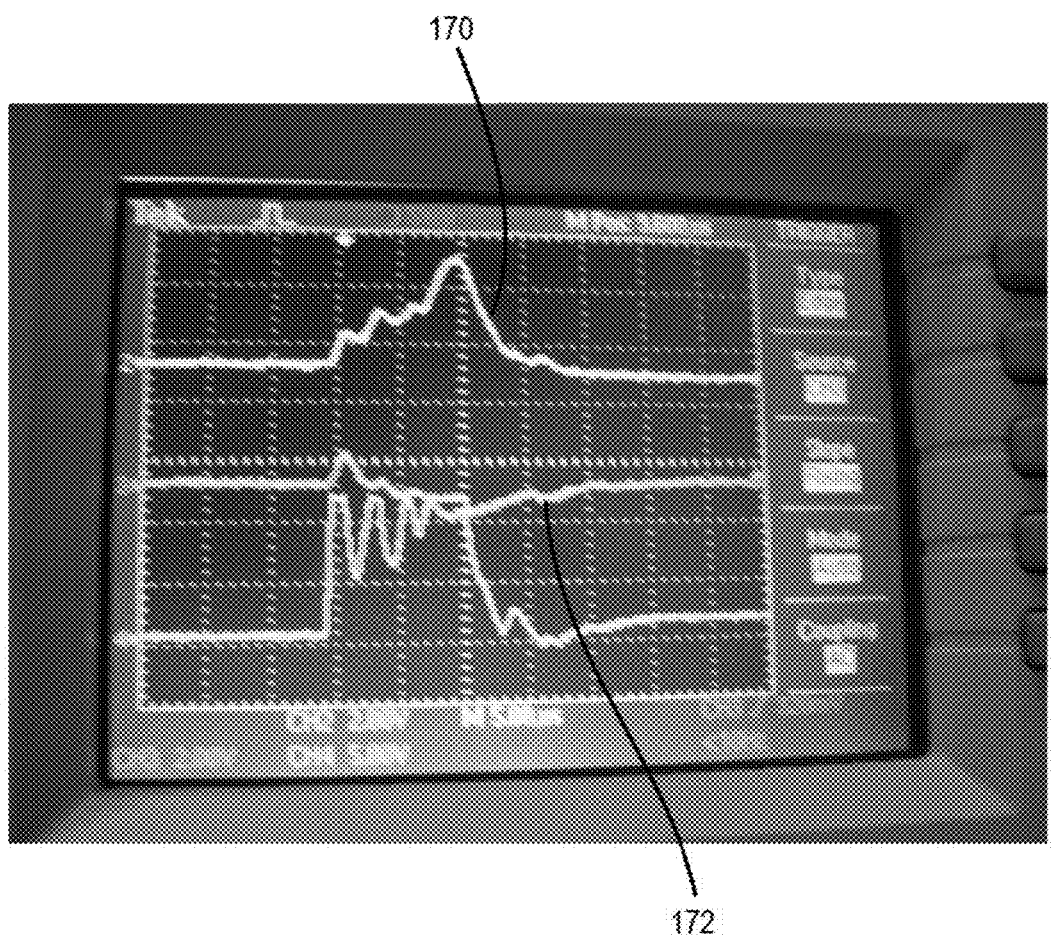
Figure 7L:
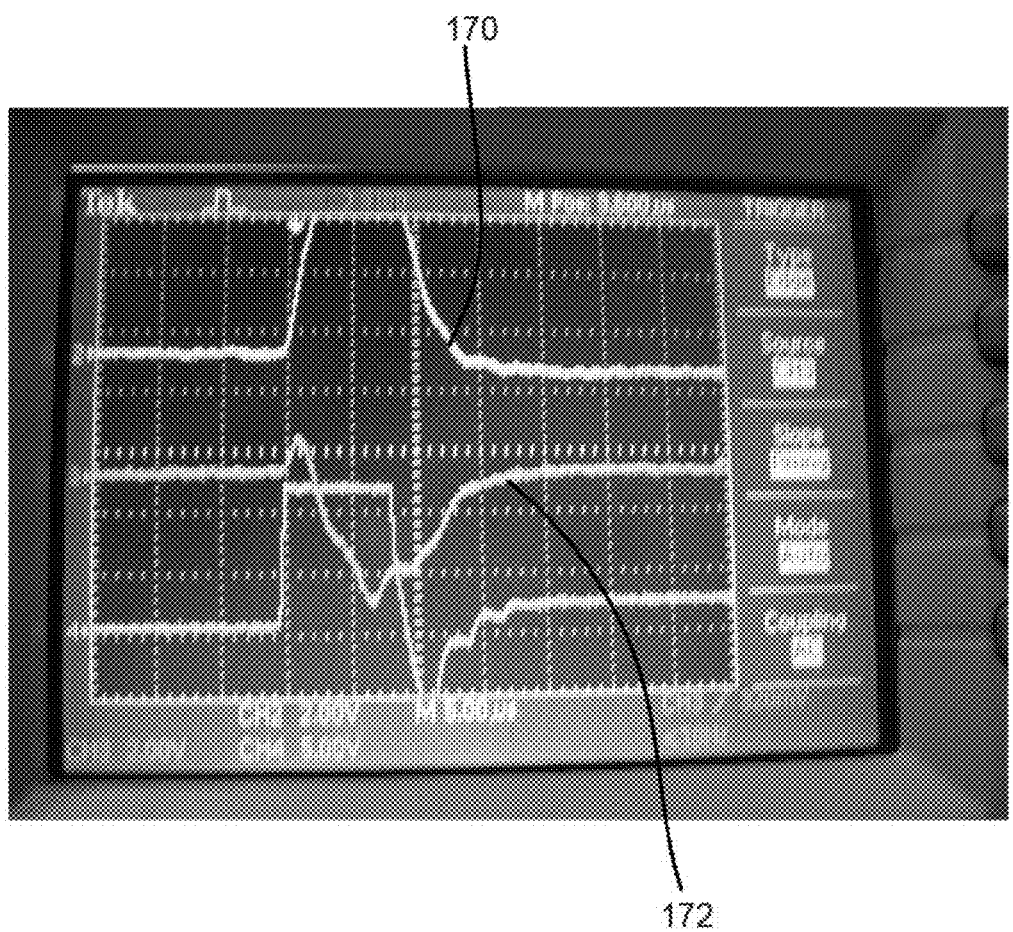

FIG. 6 is a photograph of waveforms for the signals at the front electrode 104, the rear electrode 106, and the anode 114, shown on the oscilloscope 122 when a gamma ray (or other types of non-neutron radiation) is detected by the microchannel plate 102. It is important to note that these waveforms are on a microsecond time scale, stretched and conditioned by RC time constants of the MCP electrodes together with their connections to external electronics, in contrast to the much faster 'raw' nanosecond pulse width characteristic of the electron avalanche developed along the length inside the hollow microchannel. The top trace 160 is the front electrode signal or pulse (abbreviated as FP), the middle trace 162 is the rear electrode pulse (RP), and the bottom trace 164 is the inverted anode signal. The electrode signals for the front and rear electrodes are both positive, while the anode collects a negative charge cloud (electrons), so the collected pulse at the anode is negative. For convenience in display on the oscilloscope, the anode polarity is flipped so that it is displayed as positive-going.

The gamma ray rear electrode pulse 162 (middle trace) is typically larger in amplitude than the front electrode pulse 160 (top trace), with a larger integrated area. Both traces are positive-going before returning to baseline. This is likely due to the larger charge as the avalanche grows towards the bottom of the microchannel or output end, with the positive holes left behind on the channel wall inducing a stronger positive pulse at the rear electrode 106.

FIGS. 7A to 7L show oscilloscope screen photos of examples of signals generated at the front electrode 104, rear electrode 106, and the anode 114 when neutrons are detected at the microchannel plate 102. In these examples, the neutron detector 100 was exposed to shutter open and closed conditions in a relatively weak thermal neutron beam at the University of Massachusetts-Lowell's research reactor (UML), operating at only 10 kW or 1% of full power. The neutron flux at the neutron detector 100 ranged from about 10 to 1000 n cm$^{-2}$ s$^{-1}$ (beam shutter closed and open, respectively, at 10 kW).

The waveforms in FIGS. 7A to 7L show that there are significant variations in the rear electrode signal pulse shape among individual neutron events. This is due to the overall waveform being a superposition or convolution of multiple contributions, each with an associated statistical variation, for example the random depth of neutron interactions within the solid microchannel wall material, as well as some statistical variation in the ionization charge energy deposition along the track (random in starting angle), of heavy and energetic charged particle motion inside the channel wall material.

In all of these examples, the front electrode pulse 170 (upper trace) remains positive relative to the baseline, while the rear electrode pulse 172 (middle trace) dips negative relative to baseline for neutron events. These examples show that it may be possible to distinguish single neutron events as they occur in a microchannel plate detector (similar to a He-3 detector) from single gamma ray events. It may thus be possible to uniquely identify each and every microchannel plate pulse in real-time, identifying it in binary fashion as either a neutron, or not a neutron (e.g., gamma ray, ion, electron, UV photon, X-ray, or noise).

From the examples in FIGS. 7A to 7L, there can be at least two different ways to discriminate a neutron event from a non-neutron event.

In the first method, the rear and front microchannel plate electrode pulses are compared, e.g., comparing their overall shapes. For example, the area under both signal pulses can be integrated for, e.g., tens of microseconds, and then either the sum or difference between the two is calculated. A neutron event will give a very different result as compared with a gamma event, either in the sign or magnitude of the summed pulse areas.

The photos show that the rear electrode pulse initially swings positive, but then drops negative a bit later in the pulse, on a microsecond time scale. One possible explanation is that the rear electrode pulse has two parts: there is initially a very fast sub-nanosecond electron avalanche formed within the hollow microchannel open space, giving a ~1 nanosecond positive-going pulse (from induced positive holes left behind on the channel wall electron emitting surface layer near the channel output), which then gets integrated by the RC pickoff circuit, with its microsecond time constant.

The second, slower component of the rear electrode pulse, varying from pulse to pulse, is due to the alpha (and Li) ~1 MeV massive reaction particles, as they slow down and lose their substantial energy in the formation of electron-ion pairs deep inside in the channel wall. Here, their –dE/dx slowing down or Linear Energy Transfer leave behind a very large ionization track, a few microns in length, including a very large number of low energy electron and positive ion pairs (perhaps ~10,000+) resulting from atomic ionization processes which in turn give rise to secondary fast electron ionization (e.g., delta rays).

The very high bias field gradient across the MCP of 2 kV/mm separates the oppositely charged electrons and ions, and beyond a certain field strength threshold, prevents them from recombining (there may be a threshold at around 1600-1700 $V_{mcp}$ the 100:1 length/depth HB-4 MCPs). Then the negatively charged electron cluster is pulled down towards the rear electrode 106 through the solid glass material (mainly $SiO_2$, with electron mobility $\mu_e$ about 20 $cm^2/(V \cdot s)$), such that the ~10,000+ electrons take a few tens of microseconds (depending on depth of occurrence) to arrive at the rear electrode 106. The rear electrode pulse shape can "go negative" (i.e., fall below the baseline) after several microseconds for neutron events, with a slow return to baseline, whereas this behavior has not been observed for the rear electrode pulse of gamma events, which remain positive-going or above the baseline. The upward drifting positive ion cluster is far slower, by perhaps ~8000× based on mass, and is instead pulled up and couples with the front electrode, and where its upward velocity induces an added component to the already existing positive-going pulse. There is a possibility that at such slow relative speeds, the positive ion cluster may also recombine with flowing bias current electrons moving in from the top electrode down into the bulk glass. The key physical process that is useful for neutron detection purposes is the very substantial electron cluster moving downwards towards the rear electrode 106. An analysis using the Shockley-Ramo theorem, solving the Laplace equation with boundary conditions and finding the weighting potentials, may provide detailed information on the induced electrode charge or current observed. The collective electron motion in the solid channel wall may provide a greater contribution to the electrode signal than the positive charge motion, due to differences in the weighting potentials as well as the different charge mobilities.

In the second method, only the rear electrode signal is analyzed, without comparing it to the front electrode signal. In both first and second methods, it is not necessary to analyze the anode/collector signal.

In some implementations, a single-channel electron multiplier (e.g., Channeltron), or a multiple channel (e.g., about 10 channels) Spiraltron can be used instead of a microchannel plate. The Spiraltron has ~1 mm diameter channels and are several centimeters in length. However, in contrast with the thin microchannel plate wafer, where the electron cluster only needs to traverse ~1 mm or less, in this case the rear electrode pulse induced by the collective motion of the ionization electron cluster may be considerably weaker, manifesting an even more stretched-out negative integrated pulse waveform (e.g., ~0.1 to 1 millisecond induced pulse width). This is due to the much greater distance travelled on average by the electron cluster, as it moves through the solid channel wall material prior to reaching the rear electrode.

In addition to using the electrons traveling through the solid microchannel walls and collected at the output electrode 106 to determine whether a neutron has been detected, induced charges at the input and output electrodes due to the avalanche of secondary electrons within the hollow microchannels can also be used. The following is a description of using induced charges for neutron detection.

Figure 8:
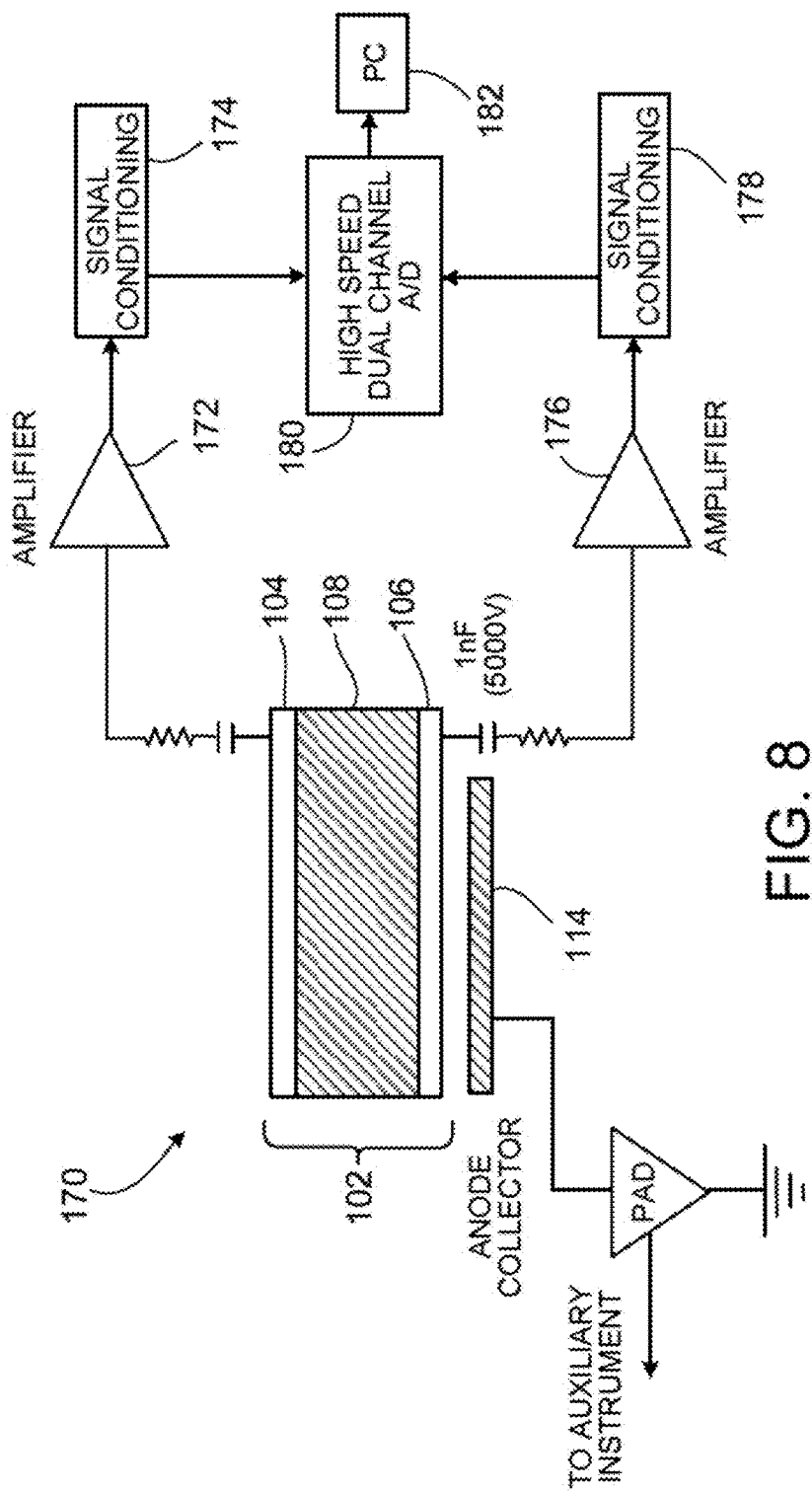
FIG. 8 is a block diagram of a neutron detector.

Referring to FIG. 8, a neutron detector 170 can detect neutrons using information about charges induced on the input and output electrodes of a microchannel plate due to movements of the charges prior to development of an avalanche of secondary electrons. In some implementations, the neutron detector 170 includes a microchannel plate 102 that has an input electrode 104, an output electrode 106, and a glass plate 108 having an array of microscopic channels. An amplifier 172 amplifies the signals read out from the input electrode 104, and a signal conditioning unit 174 conditions the signals output from the amplifier 172. An amplifier 176 amplifies the signals read out from the output electrode 106, and a signal conditioning unit 178 conditions the signals output from the amplifier 176. A high-speed dual channel analog-to-digital converter 180 samples the analog signals output from the signal conditioning units 174, 178, and converts the analog signals to digital data. A computer 182 stores and processes the digital data.

Figure 9:
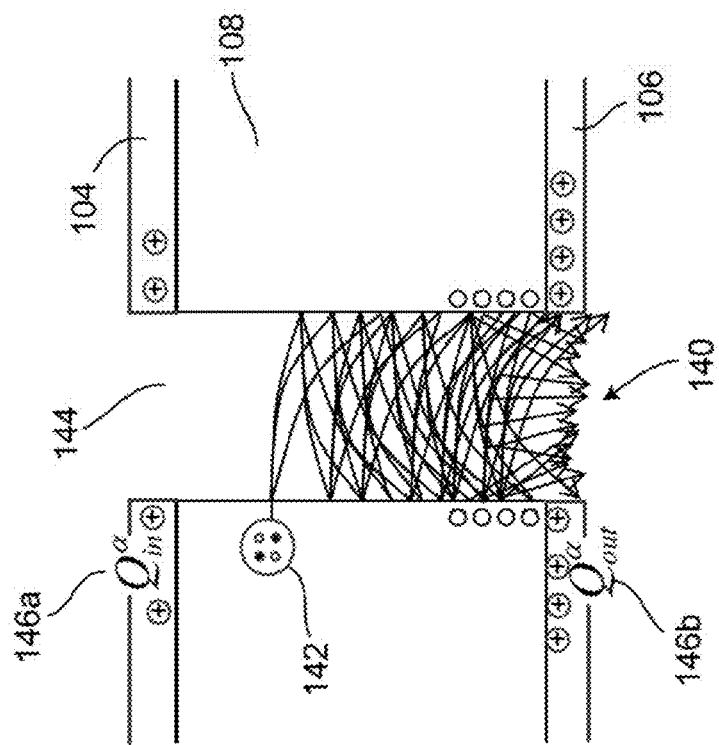

Referring to FIG. 9, an avalanche of electrons 140 results when a helium-4 particle 142 and the accompanying electrons (freed by the helium-4 particle as it propagates in the glass material of the glass plate 108) enter the microchannel 144. Due to the avalanche of electrons produced by the lithium-7 and helium-4 particles, charges $Q_{in}^{\alpha}$ 146a are induced on the input electrode 104, and charges $Q_{out}^{\alpha}$ 146b are induced on the output electrode 106. Here, the notations $Q_{in}^{\alpha}$ and $Q_{out}^{\alpha}$ represent charges induced by the helium-4 and lithium-7 particles, and the electrons freed by the helium-4 and lithium-7 particles.

Figure 10:
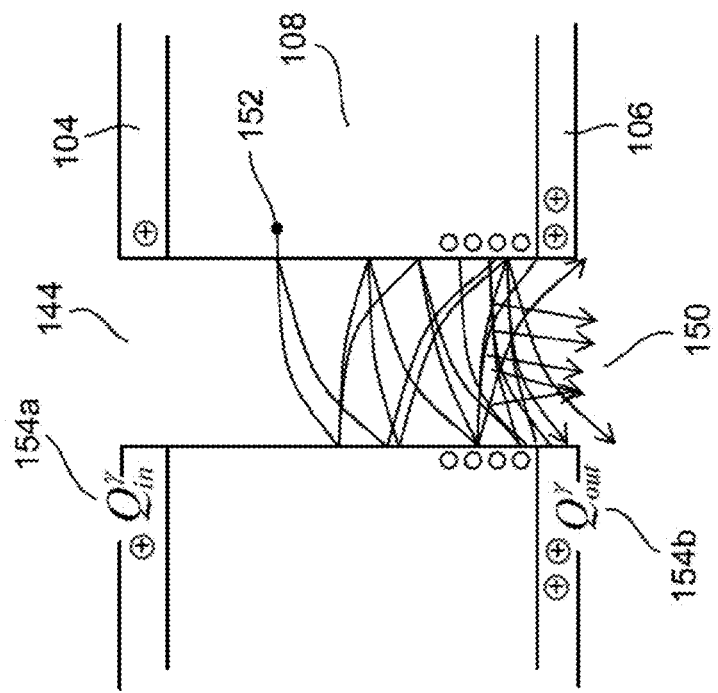
FIGS. 9 and 10 are diagrams of secondary electron avalanche developments.

FIG. 10 is a diagram depicting an avalanche of electrons 150 that results when an energetic electron 152 generated from the interaction of a gamma ray and a lead atom, and the accompanying electrons (freed by the electron 152 as it propagates in the glass material of the glass plate 108), enter the microchannel 144. Due to the avalanche of electrons produced by the energetic electron 152, charges $Q_{in}^{\gamma}$ 154a are induced on the input electrode 104, and charges $Q_{out}^{\gamma}$ 154b are induced on the output electrode 106.

A comparison of FIGS. 9 and 10 shows that more electrons are generated from the interaction between a neutron and the boron-10 atom than from the interaction between a gamma ray and a lead atom. As a result, the charges $Q_{in}^{\alpha}$ 146a and $Q_{out}^{\alpha}$ 146b induced on the input and output electrodes 104, 106, respectively, associated with a neutron event are greater than the charges $Q_{in}^{\gamma}$ 154a and $Q_{out}^{\gamma}$ 154b induced on the input and output electrodes 104, 106, respectively, associated with a gamma ray event.

Judging by the amplitude of the induced charges in the input and output electrodes 104, 106 may not be sufficient to accurately determine whether a neutron or a gamma ray has been detected because the total number of secondary electrons depends on the location of the interaction between the neutron and the boron-10 atom, or between the gamma ray and the lead atom. The difference in the induced charges resulting from a neutron interacting with a boron-10 atom located near the output electrode 106 and the induced charges resulting from a gamma ray interacting with a lead atom located near the input electrode 104 may not be sufficiently large to allow accurate determination of whether a neutron or gamma ray is detected.

In some implementations, a neutron verification parameter W1 used for discriminating between neutrons and gamma rays can be calculated using the following formula:

$$W1 = \frac{Q_{in}/Q_{out}}{Q_{in}+Q_{out}},\quad \text{(Equation 1)}$$

where Qin represents the charges induced on the input electrode 104 and Qout represents the charges induced on the output electrode 106.

In Equation 1, the charges are normalized to compensate for the variances in the induced charges due to the variations in the locations where the interactions occur. The denominator (Qin+Qout) will be substantially larger for a neutron event than a gamma ray event, so the neutron verification parameter W1 will have a substantially smaller value for a neutron event than for a gamma ray event.

The neutron detector 170 can be calibrated by irradiating the microchannel plate 102 with neutrons generated from a neutron source and calculating the values for the neutron verification parameter W1. The neutron verification parameters W1 may have values that fall within a first range of values. The first range of values are stored in the computer 182 (FIG. 8) and are associated with neutron events.

The microchannel plate 102 is then irradiated with gamma rays generated from a gamma ray source, and values for the neutron verification parameter W1 are calculated. The neutron verification parameters W1 may have values that fall within a second range of values. The second range of values are stored in the computer 182 and are associated with gamma ray events. It may be possible to adjust the voltage applied to the electrodes 104, 106 to adjust the first range of values and the second range of values, for example, to increase the separation between the first range of values and the second range of values.

When the neutron detector 170 is used to detect radiation from an unknown source, the charges Qin and Qout induced on the input and output electrodes 104, 106, respectively, are measured and the neutron verification parameter W1 is calculated. If the neutron verification parameter W1 is within the first range of values associated with a neutron event, the neutron detector 170 generates a signal indicating that a neutron has been detected. If the neutron verification parameter W1 is within the second range of values associated with a gamma ray event, the neutron detector 170 determines that a gamma ray has been detected.

In some implementations, charges induced on the input and output electrodes 104, 106 due to movements of the charges prior to the development of avalanche of secondary electrons can also be used to discriminate between a neutron event and a gamma ray event.

FIG. 11A shows an incident neutron 160 interacting with a boron-10 atom 162 in the glass plate 108. The interaction results in a helium-4 particle 164 (FIG. 11B) and a lithium-7 particle, both having positive charges, that travel in opposite directions at high speeds.

FIG. 11B shows an alpha particle 164 that propagates through the glass material of the glass plate 108, knocking off electrons from other atoms along the way. By the time the alpha particle 164 emerges from the glass material and enters a channel 166, several free electrons 168 and other charged particles such as protons or cesium ions are generated, which also enter the channel 166. Similarly, the lithium-7 particle propagates through the glass material and frees electrons and other charged particles along the way, resulting in the lithium-7 particle and additional free electrons and other charged particles entering another channel.

Referring to FIG. 11C, when charged particles 168 (for example, the alpha particle 164 and free electrons) propagate at high speeds in the glass material and in the microchannel 166, charges are induced on the input and output electrodes 104, 106. In this example, the charges on the input and output electrodes 104, 106 are induced by the moving particles in the glass material and microchannels during a short period of time prior to the avalanche of secondary electrons. The transient and ultrafast movements of the initiating charged particles (for example, helium-4 and free electrons) cause corresponding variations of an induced charge Q on one or both electrodes 104, 106. The induced charge Q is converted to a voltage pulse using an ultrafast charge sensing amplifier.

Without being limited by any theory presented herein, the basis of this method can be explained by the Shockley-Ramo theorem, which relates the induced charge Q and current i on an electrode induced by a moving point charge q. It has the consequence that the induced charge Q on one or both electrodes 104, 106, as produced by the moving charge q, depends only on the location of the moving charge q and the configuration of the MCP, and is independent of applied bias voltages and any other charge distributions.

Specifically, the transient and ultrafast movements of the initiating charged particles induce a charge $Q'^{\alpha}_{in}$ on the input electrode 104 and a charge $Q'^{\alpha}_{out}$ on the output electrode 106. Here, the notations $Q'^{\alpha}_{in}$ and $Q'^{\alpha}_{out}$ represent charges induced by the helium-4 and lithium-7 particles, and the electrons freed by the helium-4 and lithium-7 particles. The charges $Q'^{\alpha}_{in}$ and $Q'^{\alpha}_{out}$ can be measured within a short timing window having a duration, for example, from 1 pico-second (ps) to 100 ps. The timing window is selected to be prior to the subsequent secondary electron avalanche development. Depending on the configuration of the microchannel plate 102, the timing window can have various durations, such as 2 ps, 5 ps, 10 ps, 20 ps, 40 ps, 80 ps, 100 ps, 120 ps, 160 ps, or some other duration.

The secondary electron avalanche may require more than 100 ps to fully develop and transit down through the microchannel, accumulating an exponential increase in charge until it exits the bottom of the microchannel. As the full charge cloud passes the output of the channel to land on the metal collecting anode 114, the charge cloud induces a strong positive-going signal pulse on the output electrode 106.

FIG. 12A shows an incident gamma ray 170 interacting with a lead atom 172 in the glass plate 108. The interaction produces an energetic electron 174 (FIG. 12B).

FIG. 12B shows the free electron 174 propagating through the glass material of the glass plate 108, freeing another electron along the way, resulting in up to about two electrons 176 entering a channel 166.

Referring to FIG. 12C, when the electrons 176 propagate at high speeds in the glass material and in the microchannel, charges are induced on the input and output electrodes 104, 106. Here, the charges on the input and output electrodes 104, 106 are induced by the high speed free electrons moving in the glass material and microchannel during a short period of time prior to the avalanche of secondary electrons. The electrons 176 induce a charge $Q'^{\gamma}_{in}$ on the input electrode 104 and a charge $Q'^{\gamma}_{out}$ on the output electrode 106. The charges $Q'^{\gamma}_{in}$ and $Q'^{\gamma}_{out}$ can be measured within a short timing window having a duration, for example, from 1 pico-second (ps) to 100 ps. The timing window is selected to be prior to the subsequent electron avalanche development.

The charges $Q'_{in}$ and $Q'_{out}$ induced on the input and output electrodes 104, 106, respectively, depend on the location of the moving charges (for example, helium-4, lithium-7, and/or free electrons), and are independent of the bias voltage 110 and stationary space charges in the microchannel plate 102. The induced charges $Q'_{in}$ and $Q'_{out}$ can be amplified, digitized, and analyzed.

A comparison of FIGS. 12C and 11C shows that more moving electrons are generated from the interaction between the neutron 160 and the boron-10 atom 162 than from the interaction between the gamma ray 170 and the lead atom 172. As a result, the charges $Q'_{in}{}^\alpha$ and $Q'_{out}{}^\alpha$ induced on the input and output electrodes 104, 106, respectively, associated with a neutron event are greater than the charges $Q'_{in}{}^\gamma$ and $Q'_{out}{}^\gamma$ induced on the input and output electrodes 104, 106, respectively, associated with a gamma ray event.

In some implementations, a neutron verification parameter W2 used for discriminating between neutrons and gamma rays can be calculated using the following formula:

$$W2 = \frac{Q'_{in}/Q'_{out}}{Q'_{in}+Q'_{out}}, \quad \text{(Equ. 2)}$$

where $Q'_{in}$ represents the charges induced on the input electrode 104 and $Q'_{out}$ represents the charges induced on the output electrode 106 due to the moving charges (for example, helium-4, lithium-7, and or free electrons) in the glass material or microchannel.

In Equ. 2, similar to Equ. 1, the charges are normalized to compensate for the variances in the induced charges due to the variations in the locations where the interactions occur. The denominator ($Q'_{in}+Q'_{out}$) will be substantially larger for a neutron event than a gamma ray event, so the neutron verification parameter W2 will have a substantially smaller value for a neutron event than a gamma ray event.

The neutron detector 170 (FIG. 8) can be calibrated by irradiating the microchannel plate 102 with neutrons generated from a neutron source and calculating the values for the neutron verification parameter W2. The neutron verification parameters W2 may have values that fall within a first range of values. The first range of values are stored in the computer 182 and are associated with neutron events.

The microchannel plate 102 is irradiated with gamma rays generated from a gamma ray source and values for the neutron verification parameter W2 are calculated. The neutron verification parameters W2 may have values that fall within a second range of values. The second range of values are stored in the computer 182 and are associated with gamma ray events. It may be possible to adjust the voltage applied to the electrodes 104, 106 to adjust the first range of values and the second range of values, for example, to increase the separation between the first range of values and the second range of values.

When the neutron detector 170 is used to detect radiation from an unknown source, the charges $Q'_{in}$ and $Q'_{out}$ induced on the input and output electrodes 104, 106, respectively, are measured and the neutron verification parameter W2 is calculated. If W2 is within the first range of values associated with a neutron event, the neutron detector 170 generates a signal indicating that a neutron has been detected. If W2 is within the second range of values associated with a gamma ray event, the neutron detector 170 determines that a gamma ray has been detected.

In some implementations, when the neutron detector 170 is used, both neutron verification parameters W1 and W2 are calculated for determining detection of neutrons with high confidence. For example, when a first signal pulse from the input electrode 104 and a second signal pulse from the output electrode 106 are detected, the computer 182 examines the signal pulses within a short timing window (for example, having a duration from 1 ps to 100 ps) and calculates the neutron parameter W2. The computer 182 then examines the signal pulses after the short timing window during a time duration associated with the development of a secondary electron avalanche and calculates the neutron parameter W1. The neutron verification parameters W1 and W2 are compared to pre-stored ranges of parameter values associated with neutron events and gamma ray events. If both W1 and W2 parameters indicate a neutron event, the neutron detector 180 generates a signal indicated that a neutron is detected.

Figure 13B:
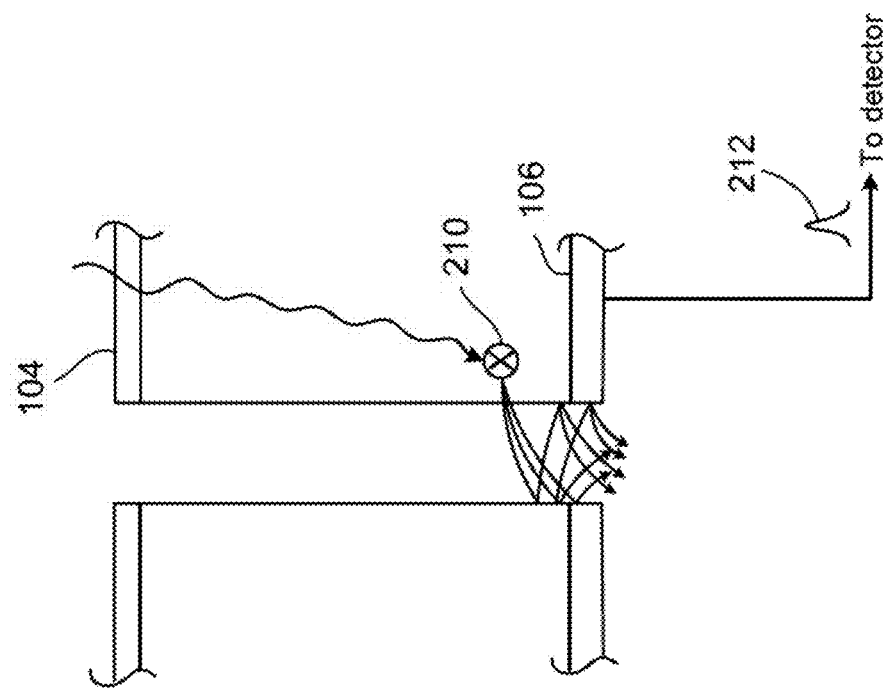
FIGS. 13A and 13B are diagrams showing interactions between an incident neutron or gamma ray and a particle in the microchannel plate.
Figure 13A:
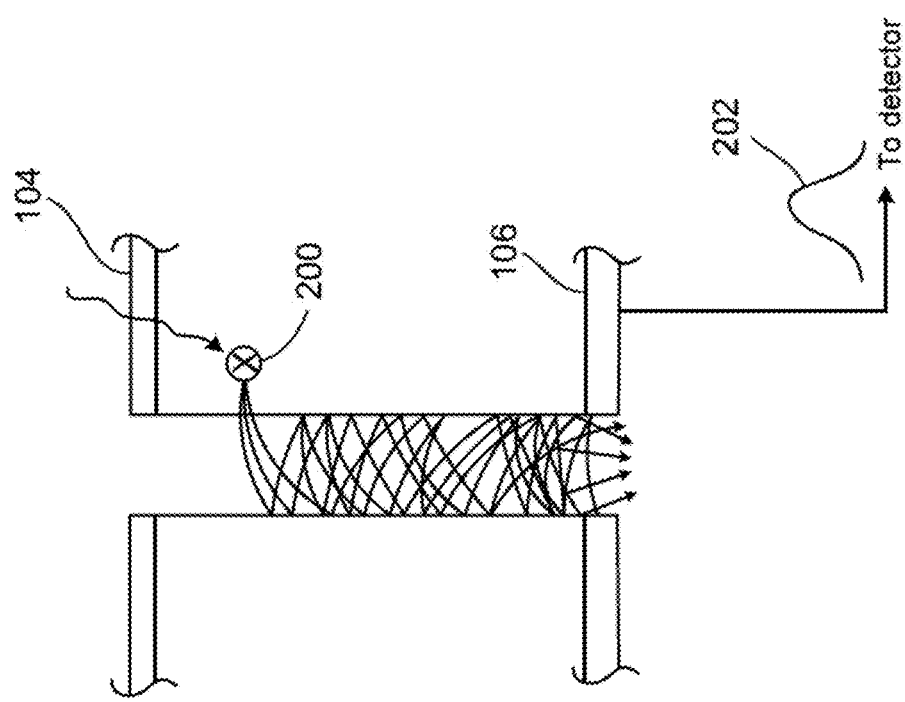

Referring to FIGS. 13A and 13B, depending upon the point of event initiation (where a neutron or gamma ray interacts with a particle in the microchannel plate), the width of the induced charge signal obtained from the output electrode may be different. For example, as shown in FIG. 13A, when a neutron or gamma ray interacts with a particle 200 that is closer to the input electrode 104, the induced charge signal 202 detected at the output electrode 106 will be wider. By comparison, as shown in FIG. 13B, when a neutron or gamma ray interacts with a particle 210 that is closer to the output electrode 106, the induced charge signal 212 detected at the output electrode 106 will be narrower.

The pulse width can be compare with the pulse amplitude for assisting in determining whether a neutron or gamma ray has been detected. For example, neutron pulses may differ from gamma ray pulses, and the two types of pulses may fall into different zones of an x-y plot, in which the x-axis represents the pulse width or rise-time, and the y-axis represents the pulse amplitude.

Without being limited by any theory presented herein, the basis of the different in pulse widths for neutron and gamma events can be explained as follows. The developing avalanche or pulse proceeds down the microchannel with a transit time t, and a transit time spread dt, which is a statistical spreading arising from the convolution of multiple statistical distributions of secondary electron emission angle, energy, and number. For example, the transit time spread dt for a 12 micron pore, 40:1 L/D MCP operated at 800V is about 60 ps based on the FWHM of a time-of-flight analysis, with the corresponding overall avalanche transit time of about 190 ps. Other secondary factors may also cause the pulse to broaden further (e.g., up to 2×), where the above values represent the idealized t and dt values. As a rough estimate, induced pulse widths at the output electrode 106 for a 10 or 12 micron pore, 40:1 MCP at typical operating voltages, may be on the order of about 100 ps, and for 80:1 MCPs, on the order of about 200 ps based on the direct proportionality of dt with channel length L, where $$dt = \sqrt{(2m/e)}L/V^{1/2},$$

where L represents the channel length. The linear proportionality of dt with channel length L implies that in MCP bulk detection mode—which applies for both neutrons and gamma rays—the pulse time spread dt depends on the point of interaction down into the depth of the microchannel. A gamma ray interacting and creating a fast photoelectron near the top of the MCP will result in a larger pulse time spread by the time the developed avalanche passes through the bottom or output end of the channel and exits, were it induces a pulse onto the bottom MCP electrode (e.g., the output electrode 106). Conversely, a gamma ray interacting near the bottom of the channel, will have fewer wall collisions prior to exiting the channel output end (and thus a much smaller built-up pulse amplitude), smaller transit time t, and less pulse broadening dt.

It may be difficult to directly measure the pulse transit time t in a microchannel. However, the transit time spread dt can be measured (as it is included in the pulse width), as can pulse rise time t and pulse amplitude Q. The rise time t can be measured using a zero crossover timing technique, by first passing the pulse signal through a double differentiator (e.g., CR-RC-CR network or double delay line shaper), and then using time-to-amplitude conversion (TAC) to convert the zero crossover time into an amplitude that can be plotted. There will be two separate and distinct pulse height distributions for neutrons versus gamma rays, relating rise time t and pulse amplitude Q. Pulse amplitude and width can be measured on either analog or digital oscilloscopes, using standard techniques. To measure pulse signals having about 100 ps pulse widths, either a very fast high speed analog oscilloscope (for example, 400 MHz) for analog measurement, or a 10 GS/s digital oscilloscope for digital measurement may be used.

Figure 14:
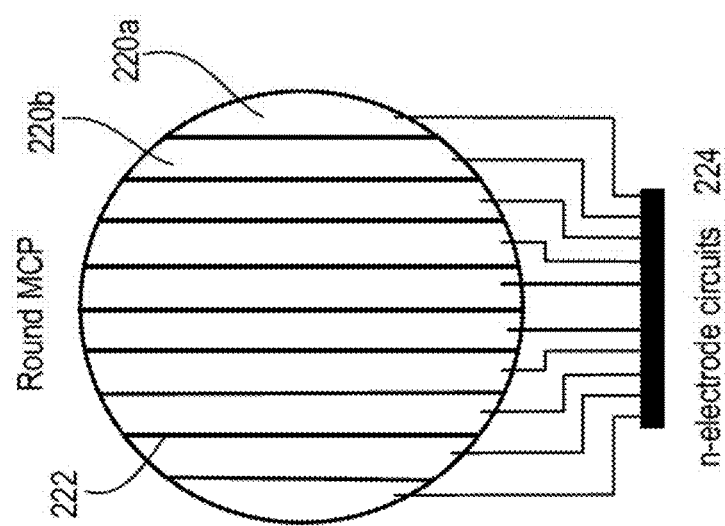
FIG. 14 is a diagram showing multiple electrodes on a face of a round microchannel plate.

Referring to FIG. 14, in some implementations, the face of a microchannel plate can be covered with multiple electrodes, such as 220a and 220b, to allow detection of neutrons with a high count rate. The example of FIG. 14 includes a round microchannel plate. Because the induced electrode pulse may be as long as tens of microseconds, if only a uniform single electrode (e.g., 106) across the MCP rear face is used, the maximum count rate that can be processed in the external electronics for distinguishing between neutrons and gamma rays, using relatively slow induced electrode pulses (which is more than, e.g., 1000 times slower than the nanosecond output pulse exiting the microchannel) may be no greater than about $10^4$ to $10^5$ counts/sec across the entire MCP area.

Having only a single electrode covering the MCP face may limit the application to mainly low count rate (e.g., 0.1 to $10^4$ counts per second) special nuclear materials (e.g., plutonium) detection. For such applications, using a single electrode covering the MCP face will likely not pose a problem because the count rates will likely be lower than $10^4$ counts per second.

There are many neutron applications, for example, in neutron imaging and diffraction, using neutrons from direct beam lines or from diffraction spectra, that require much higher count rates to be used, e.g., $10^6$ to $10^7$ cm$^2$/sec. By using multiple electrode strips (e.g., 10 to 100, or more electrode strips) to cover the MCP face, high neutron count rates may be achieved. Multiple electrode strips (e.g., 220a, 220b) can be isolated from one another, e.g., by separating adjacent electrode strips with a small gap 222 of several microns. Each of the electrode strips can be individually connected to an independent pulse counting circuit (collectively shown as "n-electrode circuits 224" in FIG. 14). Neutrons arriving at different positions across the MCP area will generate induced electrode pulses in the corresponding electrode strips located directly underneath the interaction locations. The loss due to induced pulse "straddling" of neighboring strips is likely to be small and can be compensated for or corrected in software.

Figure 15:
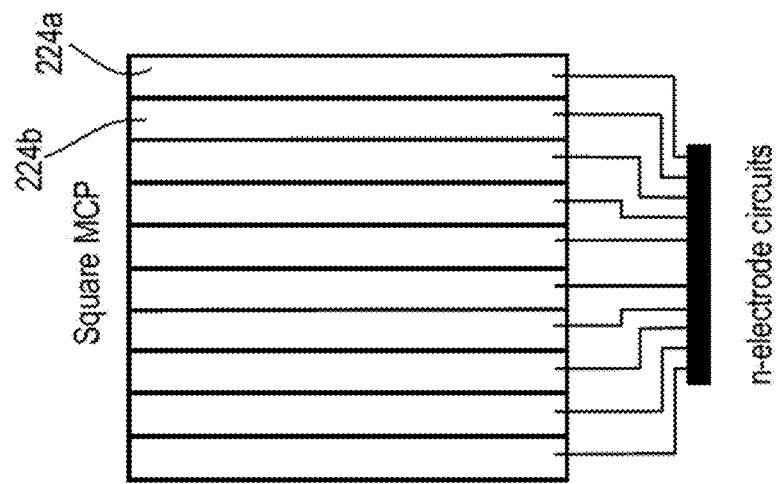
FIG. 15 is a diagram showing multiple electrodes on a face of a square microchannel plate.

FIG. 15 shows an example in which a face of a square microchannel plate is covered with multiple electrodes, such as 224a and 224b, to allow detection of neutrons with a high count rate. The operation principle of the electrodes in the example of FIG. 15 is similar to that of the electrodes in the example of FIG. 14.

In some examples where only the rear electrode signals are analyzed to detect neutrons, the rear face of the microchannel plate can be covered by multiple electrodes, such as the electrodes 220a, 220b of FIG. 14 or the electrodes 224a, 224b of FIG. 15. In some examples where both the front electrode signals and the rear electrode signals are analyzed to detect neutrons, both the front and rear faces of the microchannel plate can be covered by multiple electrodes.

It is to be understood that the foregoing description is intended to illustrate and not to limit the scope of the neutron detection devices described herein. For example, instead of a microchannel plate, a microsphere plate, a microfiber plate, or a microreticulated plate can be used. A microfiber plate may include several randomly interconnected fibers having electron-emissive surfaces disposed between an input electrode and an output electrode, as described in U.S. Pat. No. 6,828,714, which is incorporated herein by reference. A microsphere plate may include a several interconnected to spheres having electron-emissive surfaces disposed between an input electrode and an output electrode. A microreticulated plate may include a reticulated structure having electron-emissive surfaces disposed between an input electrode and an output electrode, as described in U.S. Pat. No. 7,183,701, which is incorporated herein by reference. The charges from the input and output electrodes of the microsphere plate, microfiber plate, or microreticulated plate can be used to calculate the neutron verification parameters W1 and/or W2 for use in determining whether a neutron has been detected.

For a neutron detector that verifies whether a neutron has been detected based on charges induced on the input and output electrodes prior to the development of the avalanche of secondary electrons, it is possible to position a neutron sensitive material between two electrodes, detect and analyze signals representing the induced charges using the amplifiers 172, 176, the signal conditioning units 174, 178, the high speed dual channel analog-to-digital converter 180, and computer 182 to verify whether a neutron or gamma ray has been detected. The neutron sensitive material does not need to have a particular shape.

The dimensions and shapes of the microchannels can be different from those described above. Boron-10 may exist in oxide form or in other form. The glass plate 108 of the microchannel plate 102, instead of being doped with boron-10, can be doped with lithium-6, which can capture neutrons as shown in the following reaction:

Li+$^1$n→$^3$H+$^4$He+Q(4.78 MeV);

In the case of lithium-6, the neutron capture reaction generates alpha particles (helium-4 ions) and triton particles (helium-3 ions) that can cause secondary electron emissions in the microchannels 190. The glass plate 108 can also be doped with a combination of boron-10 and lithium-6. Other neutron sensitive materials can also be used. For example, the microchannel plate can include hydrogen-containing material in which energetic protons are released and secondary electrons are produced within the microchannel plate when neutrons strike the hydrogen-containing material. The hydrogen-containing material can include, for example, a polymer that includes hydrogen atoms. The hydrogen-containing material can include, for example, a high-density polyethylene, nylon, or polyaramid. Such materials are described in, for example, U.S. Patent Application Publication 2009-0179542-A1, filed on Feb. 5, 2007, which is incorporated herein by reference.

In some implementations, the microchannel plate can have a glass plate made of low-Z glass without lead or other high mass components (materials having atomic numbers larger than 34). A thin layer of neutron-absorbing material, a thin layer of semiconducting material, and a thin layer of electron emissive material can be formed on the surfaces of the microchannels using, for example, atomic layer deposition. When an incident neutron interacts with neutron-absorbing material, the interaction produces moving charged particles that interact with the electron emissive material, which in turn emits electrons that are attracted toward the end of the microchannel having a higher electric potential. As the electrons strike against the channel walls, more electrons are released from the electron emissive layer. By using a glass plate without lead or other high mass components, there will be a lower probability of false detection of neutrons due to reactions between ambient gamma rays and lead or other high mass components.

To fabricate the microchannel plate, atomic layer deposition thin film techniques are used to modify the surfaces of the microscopic channels by forming a sequence of functional layers that conformally coat the surfaces of the microchannels. For example, a neutron-absorbing layer of boron-10 compound, such as boron-10 oxide ($^{10}B_2O_3$), boron-10 nitride ($^{10}BN$), or other material, having a thickness of about 1 μm, can be formed on the surface of the microchannels by atomic layer deposition and serves as heavy charged particle and prompt gamma ray-emitting medium. The boron-10 enriched layer can have a thickness within a range of, for example, approximately 0.5 μm to 5 μm. A resistive (semiconducting) coating can be deposited by atomic layer deposition on top of the neutron-absorbing layer to establish an electric field gradient and simultaneously allow a small leakage or bias current to flow through the microchannel surface, neutralizing the positive surface charge due to emission of secondary electrons that form the detectable electron amplification pulse following an electron avalanche. For example, the semiconducting layer can include a $AlZn_xO_y$ alloy film. The semiconducting layer 106 can have a thickness in a range from, for example, 50 to 1000 nm. A thin layer of material having a high secondary electron yield coefficient (SEC) can be deposited by atomic layer deposition on top of the semiconducting coating to enhance the overall gain. For example, the electron emissive layer can include aluminum oxide ($Al_2O_3$) or magnesium oxide (MgO). The electron emissive layer can have a thickness in a range from, for example, 3 to 12 nm, or preferably 5 to 10 nm. Other materials can also be used for the neutron-absorbing layer, semiconducting layer, and the electron emissive layer.

Elements of different embodiments described above may be combined to form embodiments not specifically described herein. Other implementations not specifically described herein are also within the scope of the following claims.

What is claimed is:

1. A method for detecting a neutron, the method comprising:
   providing a first voltage to an input electrode of a microchannel plate;
   providing a second voltage to an output electrode of the microchannel plate, the second voltage being more positive than the first voltage to provide a high voltage direct current field between the input and output electrodes to accelerate electrons in channels of the microchannel plate;
   measuring a first signal on the input electrode;
   measuring a second signal on the output electrode; and
   detecting a neutron based on a comparison of the first and second signals.

2. The method of claim 1 in which detecting a neutron comprises determining that a neutron has been detected when the polarity of the second signal is opposite to that of the first signal for a period of time.

3. The method of claim 2 in which detecting a neutron comprises determining that a neutron has been detected when the amplitude of the second signal is also above a predetermined threshold.

4. The method of claim 1 in which detecting a neutron comprises determining that a neutron has been detected when the polarity of the first and second signals are the same for a first period of time and opposite for a second period of time.

5. The method of claim 4 in which detecting a neutron comprises determining that a neutron has been detected when, for a period of time after the avalanche of secondary electrons have been detected, the polarity of the second signal is opposite to that of the first signal.

6. The method of claim 1, comprising detecting an avalanche of secondary electrons reaching an anode of the microchannel plate.

7. The method of claim 1, comprising integrating the first signal over a period of time to generate a first integral, integrating the second signal over the period of time to generate a second integral,
   wherein detecting a neutron comprises detecting a neutron based on a comparison of the first and second integrals.

8. The method of claim 7 in which detecting a neutron comprises detecting a neutron when the first integral and the second integral have different polarities.

9. The method of claim 1, comprising providing a third voltage to an anode associated with the microchannel plate, the third voltage being more positive than the second voltage.

10. The method of claim 9, comprising measuring a third signal at the anode, wherein detecting a neutron comprises detecting a neutron when, during a period of time, the first and second signals have different polarities, and the second and third signals have the same polarity.

11. The method of claim 1 in which detecting a neutron comprises detecting a neutron when the first signal remains positive relative to a baseline value for a period of time, and the second signal is positive relative to the baseline value for a first sub-period within the period of time and is negative relative to the baseline value for a second sub-period within the period of time.

12. The method of claim 1 in which the microchannel plate has a structure between the input and output electrodes, the structure comprising a hydrogen-containing material.

13. The method of claim 12 in which the hydrogen-containing material comprises a polymer.

14. The method of claim 12 in which the hydrogen-containing material comprises plastic.

15. The method of claim 12 in which the hydrogen-containing material is doped with at least one of boron-10 or lithium-6.

16. The method of claim 12 in which the hydrogen-containing material defines microchannels, and a layer of neutron sensitive material is disposed on walls of the microchannels.

17. The method of claim 16 in which the neutron sensitive material comprises at least one of boron-10 or lithium-6.

18. A method comprising:
discriminating between a neutron and a gamma ray by using a first signal on a first electrode and a second signal on a second electrode, the first and second signals being influenced by moving charged particles generated as a result of an interaction between an incident particle or radiation and a material disposed between the first and second electrodes, the material comprising a first component that is sensitive to neutrons and a second component that is sensitive to gamma rays, in which a first voltage is provided to the first electrode, a second voltage is provided to the second electrode, the second voltage being more positive than the first voltage to provide a high voltage direct current field between the first and second electrodes to accelerate electrons between the first and second electrodes; and
generating a detection signal indicating that a neutron has been detected when the first signal and the second signal have different polarities.

19. The method of claim 18 in which the material comprises at least one of an array of microscopic channels, interconnected fibers, or interconnected microspheres.

20. The method of claim 18 in which the material comprises a hydrogen-containing material.

21. The method of claim 20 in which the hydrogen-containing material comprises a polymer.

22. The method of claim 20 in which the hydrogen-containing material comprises plastic.

23. The method of claim 18 in which the charged particles comprise electrons traveling in the bulk of the material.

24. The method of claim 18, comprising detecting an avalanche of secondary electrons traveling in a channel in the material,
wherein detecting the first and second signals comprises detecting the first and second signals after detecting the avalanche of secondary electrons.

25. The method of claim 18 in which generating a detection signal comprises generating a detection signal indicating that a neutron has been detected when the second signal also has an amplitude above a predetermined threshold.

26. A method for detecting a neutron, the method comprising:
providing a microchannel plate having an input electrode and an output electrode, the input and output electrodes being connected to different voltages to provide a high voltage direct current field between the input and output electrodes to accelerate electrons in channels of the microchannel plate; and
generating a signal indicating detection of a neutron when, for a first period of time, a first signal at the output electrode has a polarity different from the polarity of a second signal at the input electrode.

27. The method of claim 26 in which generating a signal indicating detection of a neutron comprises generating a signal indicating detection of a neutron when the first and second signals have the same polarity for a second period of time prior to the first period of time.

28. A neutron detector comprising:
a microchannel plate having an input electrode, an output electrode, and a glass plate comprising microscopic channels, the input electrode to be connected to a first voltage, the output electrode to be connected to a second voltage different from the first voltage; and
a data processor to determine whether a neutron has been detected based on a comparison of a first signal on the input electrode and a second signal on the output electrode;
wherein the microchannel plate comprises an anode connected to a third voltage that is more positive than the second voltage, the second voltage being more positive than the first voltage, and the data processor is configured to determine that a neutron has been detected when, during a period of time, the first and second signals have different polarities, and the second and third signals have the same polarity.

29. The neutron detector of claim 28 in which the data processor is configured to determine that a neutron has been detected when the polarity of the second signal is opposite to that of the first signal for a period of time.

30. The neutron detector of claim 29 in which the data processor is configured to determine that a neutron has been detected when the amplitude of the second signal is also above a predetermined threshold.

31. The neutron detector of claim 28 in which the data processor is configured to determine that a neutron has been detected when the polarity of the first and second signals are the same for a first period of time and opposite for a second period of time.

32. The neutron detector of claim 28 in which the data processor is configured to detect an avalanche of secondary electrons reaching an anode associated with the microchannel plate, and determine that a neutron has been detected when, for a period of time after the avalanche of secondary electrons have been detected, the polarity of the second signal is opposite to that of the first signal.

33. The neutron detector of claim 28 in which the data processor is configured to integrate the first signal over a period of time to generate a first integral, integrate the second signal over the period of time to generate a second integral, compare the first and second integrals, and determine that a neutron has been detected based on a comparison of the first and second integrals.

34. The neutron detector of claim 33 in which the data processor is configured to determine that a neutron has been detected when the first integral and the second integral have different polarities.

35. The neutron detector of claim 28 in which the data processor is configured to determine that a neutron has been detected when the first signal remains positive relative to a baseline value for a period of time, and the second signal is positive relative to the baseline value for a first sub-period within the period of time and is negative relative to the baseline value for a second sub-period within the period of time.

36. The neutron detector of claim 28, comprising
a first high pass filter coupled to the first electrode,
a first amplifier to amplify the first signal,
a second high pass filter coupled to the second electrode, and
a second amplifier to amplify the second signal.

37. The neutron detector of claim 28 in which the microchannel plate has a structure between the input and output electrodes, the structure comprising a hydrogen-containing material.

38. The neutron detector of claim 37 in which the hydrogen-containing material comprises a polymer.

39. The neutron detector of claim 37 in which the hydrogen-containing material comprises plastic.

40. The neutron detector of claim 37 in which the hydrogen-containing material is doped with at least one of boron-10 or lithium-6.

41. The neutron detector of claim 37 in which the hydrogen-containing material defines microchannels, and a layer of neutron sensitive material is disposed on walls of the microchannels.

42. The neutron detector of claim 41 in which the neutron sensitive material comprises at least one of boron-10 or lithium-6.

43. The neutron detector of claim 28, comprising additional pairs of input and output electrodes, a portion of the glass plate being disposed between each pair of input and output electrodes, and for each additional pair of input and output electrodes, the data processor is configured to discriminate between a neutron and a gamma ray by using a third signal on the input electrode and a fourth signal on the output electrode, the third and fourth signals being influenced by moving charged particles generated as a result of an interaction between an incident particle or radiation and the portion of the glass plate disposed between the pair of input and output electrodes, the data processor configured to determine that a neutron has been detected when the third signal and the fourth signal have different polarities for a period of time.

44. The neutron detector of claim 43 in which the material disposed between the first and second electrodes comprises a hydrogen-containing material.

45. The neutron detector of claim 44 in which the hydrogen-containing material comprises a polymer.

46. The neutron detector of claim 44 in which the hydrogen-containing material comprises plastic.

47. The neutron detector of claim 44 in which the hydrogen-containing material is doped with at least one of boron-10 or lithium-6.

48. The neutron detector of claim 44 in which the hydrogen-containing material defines microchannels, and a layer of neutron sensitive material is disposed on walls of the microchannels.

49. The neutron detector of claim 48 in which the neutron sensitive material comprises at least one of boron-10 or lithium-6.

50. The neutron detector of claim 49 in which the microchannel plate has a structure between the input and output electrodes, the structure comprising a hydrogen-containing material.

51. The neutron detector of claim 50 in which the hydrogen-containing material comprises a polymer.

52. The neutron detector of claim 50 in which the hydrogen-containing material comprises plastic.

53. The neutron detector of claim 50 in which the hydrogen-containing material is doped with at least one of boron-10 or lithium-6.

54. The neutron detector of claim 50 in which the hydrogen-containing material defines microchannels, and a layer of neutron sensitive material is disposed on walls of the microchannels.

55. The neutron detector of claim 54 in which the neutron sensitive material comprises at least one of boron-10 or lithium-6.

56. The neutron detector of claim 49 in which the microchannel plate has a plurality of output electrodes, each output electrode being coupled to an electronic circuit for detecting a signal on the corresponding output electrode.

57. The neutron detector of claim 43, comprising additional pairs of electrodes, a portion of the material being disposed between each pair of electrodes, and for each pair of electrodes, the data processor is configured to discriminate between a neutron and a gamma ray by using a third signal on one of the pair of electrodes and a fourth signal on another of the pair of electrodes, the third and fourth signals being influenced by moving charged particles generated as a result of an interaction between an incident particle or radiation and the portion of material disposed between the pair of electrodes, the data processor configured to determine that a neutron has been detected when the third signal and the fourth signal have different polarities for a period of time.

58. A neutron detector comprising:
a first electrode;
a second electrode;
a material disposed between the first and second electrodes, the material comprising a first component that is sensitive to neutrons and a second component that is sensitive to gamma rays; and
a data processor configured to discriminate between a neutron and a gamma ray by using a first signal on the first electrode and a second signal on the second electrode, the first and second signals being influenced by moving charged particles generated as a result of an interaction between an incident particle or radiation and the material disposed between the first and second electrodes, the data processor configured to determine that a neutron has been detected when the first signal and the second signal have different polarities for a period of time;
wherein the data processor is configured to detect an avalanche of secondary electrons traveling in a channel in the material, and detect the first and second signals after detecting the avalanche of secondary electrons.

59. The neutron detector of claim 58 in which the material comprises at least one of an array of microscopic channels, interconnected fibers, or interconnected microspheres.

60. The neutron detector of claim 58 in which the charged particles comprise electrons traveling in the bulk of the material.

61. The neutron detector of claim 58 in which the data processor is configured to generate a detection signal indicating that a neutron has been detected when the second signal also has an amplitude above a predetermined threshold.

62. A neutron detector comprising:
a microchannel plate having an input electrode and an output electrode, the input and output electrodes being connected to different voltages to provide a high voltage direct current field between the input and output electrodes to accelerate electrons in channels of the microchannel plate; and
a data processor configured to determine that a neutron has been detected when, for a first period of time, a first signal at the output electrode has a polarity different from the polarity of a second signal at the input electrode.

63. The neutron detector of claim 62 in which the data processor is configured to generate a signal indicating detection of a neutron when the first and second signals have the same polarity for a first period of time, and have opposite polarities for a second period of time.

64. A neutron detector comprising:
a microchannel plate having an input electrode, an output electrode, and a glass plate comprising microscopic channels, the input electrode to be connected to a first voltage, the output electrode to be connected to a second voltage different from the first voltage; and a data processor to determine whether a neutron has been detected based on a comparison of a first signal on the input electrode and a second signal on the output electrode;

wherein the data processor is configured to determine that a neutron has been detected when the first signal remains positive relative to a baseline value for a period of time, and the second signal is positive relative to the baseline value for a first sub-period within the period of time and is negative relative to the baseline value for a second sub-period within the period of time.

65. A method for detecting a neutron, the method comprising:
providing a first voltage to an input electrode of a microchannel plate;
providing a second voltage to an output electrode of the microchannel plate, the second voltage being more positive than the first voltage;
providing a third voltage to an anode associated with the microchannel plate, the third voltage being more positive than the second voltage;
measuring a first signal on the input electrode;
measuring a second signal on the output electrode; and
detecting a neutron based on a comparison of the first and second signals.

66. The method of claim 65, comprising measuring a third signal at the anode, wherein detecting a neutron comprises detecting a neutron when, during a period of time, the first and second signals have different polarities, and the second and third signals have the same polarity.

67. A method for detecting a neutron, the method comprising:
providing a first voltage to an input electrode of a microchannel plate;
providing a second voltage to an output electrode of the microchannel plate, the second voltage being more positive than the first voltage;
measuring a first signal on the input electrode;
measuring a second signal on the output electrode; and
detecting a neutron based on a comparison of the first and second signals;
wherein detecting a neutron comprises detecting a neutron when the first signal remains positive relative to a baseline value for a period of time, and the second signal is positive relative to the baseline value for a first sub-period within the period of time and is negative relative to the baseline value for a second sub-period within the period of time.

* * * * *